(12) United States Patent
Zhang et al.

(10) Patent No.: US 12,348,075 B2
(45) Date of Patent: Jul. 1, 2025

(54) SYSTEMS AND METHODS FOR ADJUSTING INPUT POWER AND/OR OUTPUT POWER OF CHARGING SYSTEMS

(71) Applicant: ON-BRIGHT ELECTRONICS (SHANGHAI) CO., LTD., Shanghai (CN)

(72) Inventors: Yunchao Zhang, Shanghai (CN); Chao Yao, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 497 days.

(21) Appl. No.: 17/396,459

(22) Filed: Aug. 6, 2021

(65) Prior Publication Data

US 2022/0045540 A1    Feb. 10, 2022

(30) Foreign Application Priority Data

Aug. 10, 2020    (CN) .......................... 202010793511.9

(51) Int. Cl.
| | |
|---|---|
| H01M 10/44 | (2006.01) |
| H01M 10/46 | (2006.01) |
| H02J 7/00 | (2006.01) |

(52) U.S. Cl.
CPC ...... H02J 7/007192 (2020.01); H02J 7/0047 (2013.01)

(58) Field of Classification Search
CPC .......... H02J 7/007192; H02J 7/007182; H02J 7/0047; H02J 7/00045; H02M 1/327; H02M 3/33561; H02M 3/33546
(Continued)

(56) References Cited

U.S. PATENT DOCUMENTS

| | | |
|---|---|---|
| 9,184,665 B2 | 11/2015 | Lan et al. |
| 2007/0236197 A1 | 10/2007 | Vo |

(Continued)

FOREIGN PATENT DOCUMENTS

| | | |
|---|---|---|
| CN | 103825466 A | 5/2014 |
| CN | 204349510 U | 5/2015 |

(Continued)

OTHER PUBLICATIONS

Machine translation of TW201419736A (May 16, 2014) (Year: 2014).*

(Continued)

*Primary Examiner* — Edward Tso
(74) *Attorney, Agent, or Firm* — Faegre Drinker Biddle & Reath LLP

(57) ABSTRACT

System controller and method for changing an input power and/or an output power of a charging system. For example, a system controller for changing an input power of a charging system that is configured to receive an input voltage and charge a device includes: a first controller terminal configured to receive a first voltage indicating a temperature; and a second controller terminal configured to output a second voltage to affect the input power of the charging system; wherein the system controller is further configured to, if the first voltage indicates that the temperature is higher than a temperature threshold: in response to the temperature increasing, decrease the input power of the charging system; and in response to the temperature decreasing, increase the input power of the charging system.

32 Claims, 8 Drawing Sheets

(58) Field of Classification Search
USPC .......................... 320/107, 134, 136, 150, 153
See application file for complete search history.

(56) References Cited

U.S. PATENT DOCUMENTS

2014/0126250 A1* 5/2014 Lan ................... H02M 3/33507
363/21.17
2019/0372345 A1 12/2019 Bain et al.

FOREIGN PATENT DOCUMENTS

| | | |
|---|---|---|
| CN | 104868566 A | 8/2015 |
| CN | 105071466 A | 11/2015 |
| CN | 105098884 A | 11/2015 |
| JP | 08-084438 A | 3/1996 |
| JP | 5404241 B2 | 1/2014 |
| TW | I310623 B2 | 6/2009 |
| TW | 201419736 A | 5/2014 |

OTHER PUBLICATIONS

Taiwan Intellectual Property Office, Office Action mailed Dec. 10, 2021, in Application No. 109132441.

Zun, "Yutai launched a high-power charger main control chip ETA8049, which can be used for USB PD fast charging!," <https://www.chongdiantou.com/archives/37871.html>, Aug. 28, 2019.

Office Action received for Chinese Patent Application No. 202010793511.9, mailed on Sep. 4, 2023, 14 pages (6 pages of English Translation and 8 pages of Original Document).

* cited by examiner

SYSTEMS AND METHODS FOR ADJUSTING INPUT POWER AND/OR OUTPUT POWER OF CHARGING SYSTEMS

1. CROSS-REFERENCES TO RELATED APPLICATIONS

This application claims priority to Chinese Patent Application No. 202010793511.9, filed Aug. 10, 2020, incorporated by reference herein for all purposes.

2. BACKGROUND OF THE INVENTION

Certain embodiments of the present invention are directed to circuits. More particularly, some embodiments of the invention provide systems and methods for adjusting input power and/or output power of a charging system. Merely by way of example, some embodiments of the invention have been applied to a flyback switching power supply system (e.g., a power converter) that is used as a fast charging system. But it would be recognized that the invention has a much broader range of applicability.

As portable electronic devices become more powerful, the power consumption of these devices also increases. The increase in power consumption usually needs support of higher battery capacity, which in turn makes fast charging of batteries more important. Usually, the fast charging process can shorten the time needed for charging batteries but also can cause undesirable problems, such as shortening the working life of the batteries and/or raising temperatures of the devices.

Hence it is highly desirable to improve the techniques related to fast charging systems.

3. BRIEF SUMMARY OF THE INVENTION

Certain embodiments of the present invention are directed to circuits. More particularly, some embodiments of the invention provide systems and methods for adjusting input power and/or output power of a charging system. Merely by way of example, some embodiments of the invention have been applied to a flyback switching power supply system (e.g., a power converter) that is used as a fast charging system. But it would be recognized that the invention has a much broader range of applicability.

According to some embodiments, a system controller for changing an input power of a charging system that is configured to receive an input voltage and charge a device includes: a first controller terminal configured to receive a first voltage indicating a temperature; and a second controller terminal configured to output a second voltage to affect the input power of the charging system; wherein the system controller is further configured to, if the first voltage indicates that the temperature is higher than a temperature threshold: in response to the temperature increasing, decrease the input power of the charging system; and in response to the temperature decreasing, increase the input power of the charging system.

According to certain embodiments, a system controller for changing an output power of a charging system that is configured to receive an input voltage and charge a device includes: a first controller terminal configured to receive a sensing voltage indicating a temperature; and a second controller terminal configured to provide a first current to affect the output power of the charging system; wherein the system controller is further configured to, if the sensing voltage indicates that the temperature is higher than a temperature threshold: in response to the temperature increasing, decrease the output power of the charging system; and in response to the temperature decreasing, increase the output power of the charging system.

According to some embodiments, a method for changing an input power of a charging system that is configured to receive an input voltage and charge a device includes: receiving a first voltage indicating a temperature; and outputting a second voltage to affect the input power of the charging system based on at least information associated with the temperature; wherein the outputting a second voltage to affect the input power of the charging system based on at least information associated with the temperature includes: if the first voltage indicates that the temperature is higher than a temperature threshold, in response to the temperature increasing, decreasing the input power of the charging system; and if the first voltage indicates that the temperature is higher than the temperature threshold, in response to the temperature decreasing, increasing the input power of the charging system.

According to certain embodiments, a method for changing an output power of a charging system that is configured to receive an input voltage and charge a device includes: receiving a sensing voltage indicating a temperature; and providing a current to affect the output power of the charging system based on at least information associated with the temperature; wherein the providing a current to affect the output power of the charging system based on at least information associated with the temperature includes: if the sensing voltage indicates that the temperature is higher than a temperature threshold, in response to the temperature increasing, decreasing the output power of the charging system; and if the sensing voltage indicates that the temperature is higher than the temperature threshold, in response to the temperature decreasing, increasing the output power of the charging system.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for adjusting input power and/or output power of a charging system. Merely by way of example, some embodiments of the invention have been applied to a flyback switching power supply system (e.g., a power converter) that is used as a fast charging system. But it would be recognized that the invention has a much broader range of applicability.

Figure 1:
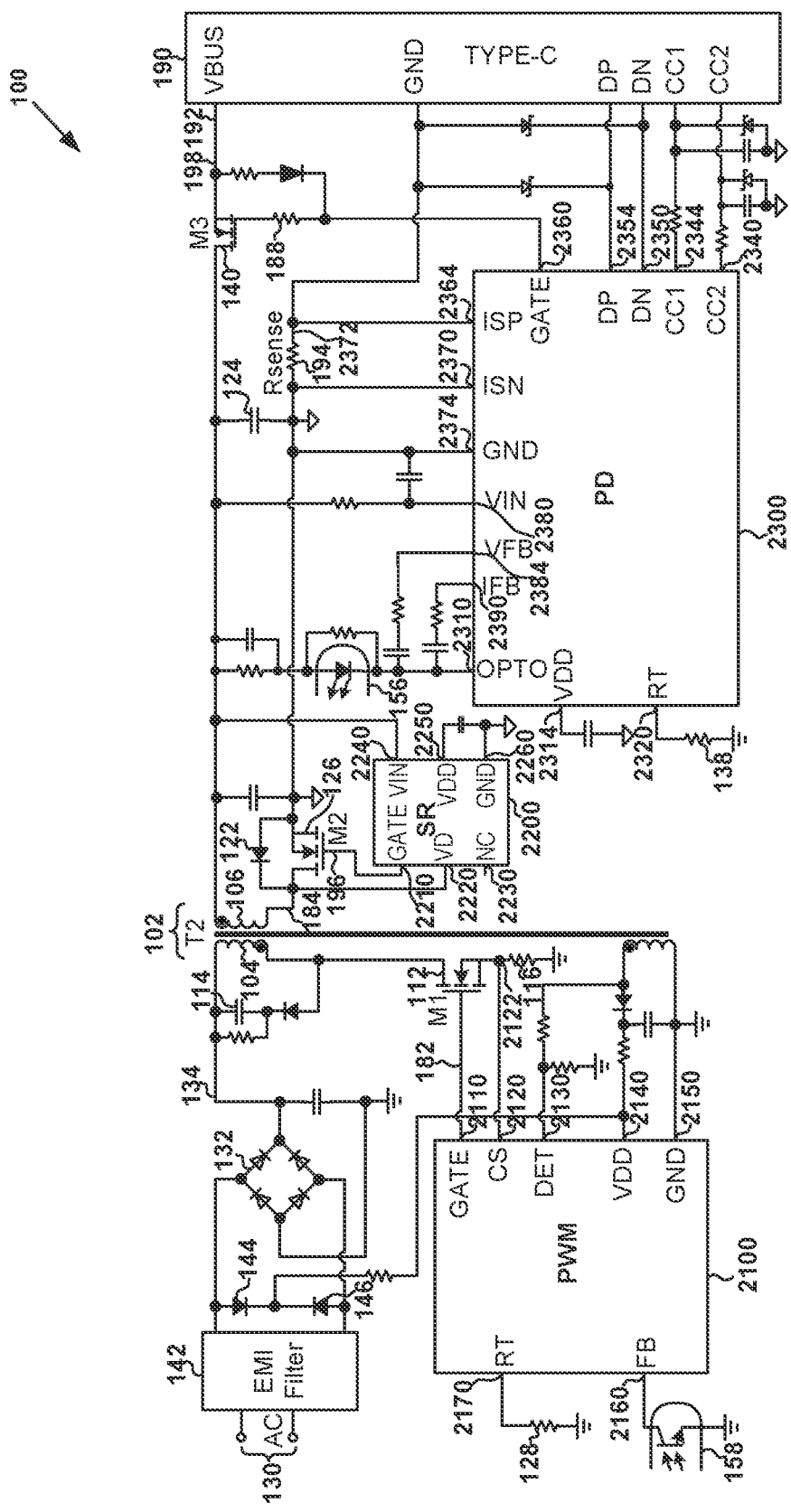
FIG. 1 is a simplified diagram showing a charging system according to certain embodiments of the present invention.

FIG. 1 is a simplified diagram showing a charging system according to certain embodiments of the present invention. This diagram is merely an example, which should not unduly limit the scope of the claims. One of ordinary skill in the art would recognize many variations, alternatives, and modifications. The charging system 100 includes a transformer 102 (e.g., T2) including a primary winding 104 and a secondary winding 106, a primary-side power switch 112 (e.g., a transistor M1), capacitors 114 and 124, resistors 116, 128, 138 and 188, a rectifier 132 (e.g., a bridge rectifier), a transistor 140 (e.g., a transistor M3), a filter 142, diodes 144 and 146, a resistor 194 (e.g., $R_{sense}$), a transistor 126 (e.g., a transistor M2) including a body diode 122, and an optocoupler including a light emitting diode 156 and a photosensitive detector 158. Additionally, the charging system 100 also includes a pulse-width-modulation (PWM) controller 2100 (e.g., a chip), a synchronous rectification (SR) controller 2200 (e.g., a chip), and a charging controller 2300 (e.g., a chip). In some examples, the charging system 100 includes a flyback switching power supply system (e.g., a power converter) that is used as a fast charging system. In certain examples, the PWM controller 2100 is on the primary side of the charging system 100, and the SR controller 2200 and the charging controller 2300 are on the secondary side of the charging system 100. As an example, the charging controller 2300 includes a fast charging protocol circuit (e.g., a PD circuit). In some examples, the light emitting diode 156 of the optocoupler is on the secondary side of the charging system 100, and the photosensitive detector 158 of the optocoupler is on the primary side of the charging system 100. Although the above has been shown using a selected group of components for the charging system 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the pulse-width-modulation (PWM) controller 2100 (e.g., a chip) changes input power of the charging system 100 based at least in part on the temperature. For example, the pulse-width-modulation (PWM) controller 2100 (e.g., a chip) detects the temperature through the terminal 2170 (e.g., an RT pin). As an example, based at least in part on the detected temperature, the pulse-width-modulation (PWM) controller 2100 (e.g., a chip) changes the input power of the charging system 100 by changing a current 2122 that flows through the resistor 116. According to some embodiments, the charging controller 2300 (e.g., a chip) changes output power of the charging system 100 based at least in part on the temperature. For example, the charging controller 2300 (e.g., a chip) detects the temperature through the terminal 2320 (e.g., an RT pin). As an example, based at least in part on the detected temperature, the charging controller 2300 (e.g., a chip) changes the output power of the charging system 100 by changing a current 2372 that flows through the resistor 194 (e.g., $R_{sense}$).

In some embodiments, the pulse-width-modulation (PWM) controller 2100 (e.g., a chip) includes a terminal 2110 (e.g., a GATE pin), a terminal 2120 (e.g., a CS pin), a terminal 2130 (e.g., a DET pin), a terminal 2140 (e.g., a VDD pin), a terminal 2150 (e.g., a GND pin), a terminal 2160 (e.g., an FB pin), and a terminal 2170 (e.g., an RT pin). In certain embodiments, the synchronous rectification (SR) controller 2200 (e.g., a chip) includes a terminal 2210 (e.g. a GATE pin), a terminal 2220 (e.g. a VD pin), a terminal 2230 (e.g. an NC pin), a terminal 2240 (e.g., a VIN pin), a terminal 2250 (e.g., a VDD pin), and a terminal 2260 (e.g., a GND pin). In some embodiments, the charging controller 2300 (e.g., a chip) includes a terminal 2310 (e.g., an OPTO pin), a terminal 2314 (e.g., a VDD pin), a terminal 2320 (e.g., an RT pin), a terminal 2340 (e.g., a CC2 pin), a terminal 2344 (e.g., a CC1 pin), a terminal 2350 (e.g., a DN pin), a terminal 2354 (e.g., a DP pin), a terminal 2360 (e.g., a GATE pin), a terminal 2364 (e.g., an ISP pin), a terminal 2370 (e.g., an ISN pin), a terminal 2374 (e.g., a GND pin), a terminal 2380 (e.g., a VIN pin), a terminal 2384 (e.g., a VFB pin), and a terminal 2390 (e.g., an IFB pin). For example, the terminal 2364 (e.g., an ISP pin) is connected to one terminal of the resistor 194 (e.g., $R_{sense}$), and the terminal 2370 (e.g., an ISN pin) is connected to another terminal of the resistor 194 (e.g., $R_{sense}$). As an example, the resistor 194 (e.g., $R_{sense}$) is coupled between the terminal 2370 (e.g., an ISN pin) and the terminal 2364 (e.g., an ISP pin).

According to certain embodiments, one terminal of the secondary winding 106 is coupled to the transistor 126 (e.g., a transistor M2) and biased at a voltage 184 (e.g., $V_D$), and another terminal of the secondary winding 106 is coupled to a terminal of the capacitor 124. For example, the transistor 126 (e.g., a transistor M2) includes one terminal connected to the secondary winding 106 and the terminal 2220 (e.g. a VD pin) of the synchronous rectification (SR) controller 2200 (e.g., a chip). In certain examples, the transistor 126 (e.g., a transistor M2) includes another terminal biased to a ground voltage on the secondary side of the charging system 100, and the transistor 126 (e.g., a transistor M2) also includes a gate terminal connected to the terminal 2210 (e.g. a GATE pin) of the synchronous rectification (SR) controller 2200 (e.g., a chip). For example, the gate terminal of the transistor 126 (e.g., a transistor M2) receives a drive signal 196 from the terminal 2210 (e.g. a GATE pin) of the synchronous rectification (SR) controller 2200 (e.g., a chip). As an example, the terminal 2320 (e.g., an RT pin) of the charging controller 2300 (e.g., a chip) is connected to a terminal of the resistor 138, which includes another terminal biased to the ground voltage on the secondary side of the charging system 100. For example, the resistance of the resistor 138 decreases with the increasing temperature of the resistor 138, and the resistance of the resistor 138 increases with the decreasing temperature of the resistor 138.

As shown in FIG. 1, the terminal 2220 (e.g. a VD pin) of the synchronous rectification (SR) controller 2200 (e.g., a chip) receives the voltage 184 (e.g., VD) of the secondary winding 106 according to some embodiments. For example, the light emitting diode 156 of the optocoupler includes two terminals, one of which is connected to the terminal 2310 (e.g., an OPTO pin) of the charging controller 2300 (e.g., a chip). As an example, the photosensitive detector 158 of the optocoupler includes two terminals, one of which is connected to the terminal 2160 (e.g., an FB pin) of the pulse-width-modulation (PWM) controller 2100 (e.g., a chip).

In certain embodiments, the filter 142 (e.g., an EMI filter) receives an alternating current (AC) voltage 130 from a voltage supply (e.g., an AC power supply). For example, the filter 142 is coupled to the diodes 144 and 146 and is also coupled to the rectifier 132 (e.g., a bridge rectifier). As an example, the rectifier 132 (e.g., a bridge rectifier) is coupled to the capacitor 114 and provides an input voltage 134 (e.g., $V_{bulk}$) to one terminal of the primary winding 104. In some examples, the primary winding 104 also includes another terminal that is connected to a drain terminal of the primary-side power switch 112 (e.g., a transistor M1), which also includes a gate terminal and a source terminal. As an example, the source terminal of the primary-side power switch 112 (e.g., a transistor M2) is connected to one terminal of the resistor 116, which includes another terminal biased to a ground voltage on the primary side of the charging system 100. For example, the gate terminal of the primary-side power switch 112 (e.g., a transistor M1) receives a drive signal 182, which closes or opens the primary-side power switch 112 (e.g., turns on or turns off the transistor M1). As an example, the terminal 2170 (e.g., an RT pin) of the pulse-width-modulation (PWM) controller 2100 (e.g., a chip) is connected to a terminal of the resistor 128, which includes another terminal biased to the ground voltage on the primary side of the charging system 100. For example, the resistance of the resistor 128 decreases with the increasing temperature of the resistor 128, and the resistance of the resistor 128 increases with the decreasing temperature of the resistor 128. In certain examples, the transistor 112 is a metal-oxide-semiconductor field-effect transistor (MOSFET). For example, the MOSFET 112 is an NMOS transistor. In some examples, the drive signal 182 is a pulse-width-modulation (PWM) signal. For example, if the drive signal 182 is at a logic high level, the primary-side power switch 112 is closed (e.g., the transistor M1 being turned on). As an example, if the drive signal 182 is at a logic low level, the primary-side power switch 112 is open (e.g., the transistor M1 being turned off).

In some embodiments, the primary winding 104 is coupled to the secondary winding 106. For example, one terminal of the secondary winding 106 is connected to one terminal of the transistor 126 (e.g., a transistor M2) and the terminal 2220 (e.g. a VD pin) of the synchronous rectification (SR) controller 2200 (e.g., a chip). As an example, another terminal of the secondary winding 106 is coupled to a terminal of the capacitor 124. In certain examples, the capacitor 124 includes another terminal that is biased to the ground voltage on the secondary side of the charging system 100. For example, a current 186 (e.g., $I_{sec}$) flows out of the secondary winding 106, and the capacitor 124 provides an output voltage 192 (e.g., $V_O$) to a load 190 (e.g., a Type-C device) if the transistor 140 (e.g., a transistor M3) is turned on. As an example, the load 190 is a device including one or more batteries that need to be charged by the charging system 100 (e.g., a power converter). For example, if the transistor 140 (e.g., a transistor M3) is turned on, the charging system 100 (e.g., a power converter) also provides an output current 198 (e.g., $I_O$) to the load 190 (e.g., a Type-C device). As an example, if the transistor 140 (e.g., a transistor M3) is turned off, the charging system 100 (e.g., a power converter) reduces the output current 198 (e.g., $I_O$) to the load 190 (e.g., a Type-C device) to zero. In some examples, the resistor 194 (e.g., $R_{sense}$) is used to detect the output current 198 (e.g., $I_O$). In certain examples, the gate terminal of the transistor 140 (e.g., a transistor M3) is coupled, through the resistor 188, to the terminal 2360 (e.g., a GATE pin) of the charging controller 2300 (e.g., a chip).

According to certain embodiments, when the primary-side power switch 112 (e.g., a transistor M1) is turned on, the primary winding 104 stores energy and the synchronous rectification (SR) controller 2200 (e.g., a chip) turns off the transistor 126 (e.g., a transistor M2). In some examples, the transistor 126 is a metal-oxide-semiconductor field-effect transistor (MOSFET). For example, the MOSFET 126 is an NMOS transistor. As an example, the MOSFET 126 is a PMOS transistor. In some examples, when the primary-side power switch 112 (e.g., a transistor M1) is turned off, the primary winding 104 transfers the stored energy to the secondary winding 106, and the synchronous rectification (SR) controller 2200 (e.g., a chip) turns on the transistor 126 (e.g., a transistor M2). For example, the secondary winding 106 undergoes the demagnetization process. As an example, the secondary winding 106 provides energy to the load 190 (e.g., a Type-C device) to be charged by the charging system 100 (e.g., a power converter).

According to some embodiments, the charging controller 2300 (e.g., a chip) includes the fast charging protocol circuit (e.g., a PD circuit). For example, the fast charging protocol circuit (e.g., a PD circuit) of the charging controller 2300 (e.g., a chip) is integrated with one or more voltage and/or current loops. As an example, the fast charging protocol circuit (e.g., a PD circuit) of the charging controller 2300 (e.g., a chip) is configured to communicate with the load 190 (e.g., a Type-C device) to be charged by the charging system 300 (e.g., a power converter) through the terminal 2344 (e.g., a CC1 pin), the terminal 2340 (e.g., a CC2 pin), the terminal 2354 (e.g., a DP pin), and the terminal 2350 (e.g., a DN pin) in order to set one or more voltages, currents, and/or powers. For example, the fast charging protocol circuit (e.g., a PD circuit) of the charging controller 2300 (e.g., a chip) is configured to send one or more notification signals to the load 190 (e.g., a Type-C device) through the terminal 2344 (e.g., a CC1 pin), the terminal 2340 (e.g., a CC2 pin), the terminal 2354 (e.g., a DP pin), and/or the terminal 2350 (e.g., a DN pin). As an example, the load 190 is a device that is to be charged by the charging system 100 (e.g., a power converter).

As discussed above and further emphasized here, FIG. 1 is merely an example, which should not unduly limit the scope of the claims. One of ordinary skill in the art would recognize many variations, alternatives, and modifications. For example, the load 190 (e.g., a Type-C device) is replaced by a plurality of loads to be charged by the charging system 100 (e.g., a power converter).

As discussed above and further emphasized here, FIG. 1 is merely an example, which should not unduly limit the scope of the claims. One of ordinary skill in the art would recognize many variations, alternatives, and modifications. For example, the pulse-width-modulation (PWM) controller 2100 (e.g., a chip) changes the input power of the charging system 100 based at least in part on the temperature detected through the terminal 2170 (e.g., an RT pin), but the charging controller 2300 (e.g., a chip) does not change the output power of the charging system 100 based at least in part on the temperature detected through the terminal 2320 (e.g., an RT pin). As an example, the charging controller 2300 (e.g., a chip) changes the output power of the charging system 100 based at least in part on the temperature detected through the terminal 2320 (e.g., an RT pin), but the pulse-width-modulation (PWM) controller 2100 (e.g., a chip) does not change the input power of the charging system 100 based at least in part on the temperature detected through the terminal 2170 (e.g., an RT pin).

Figure 2:
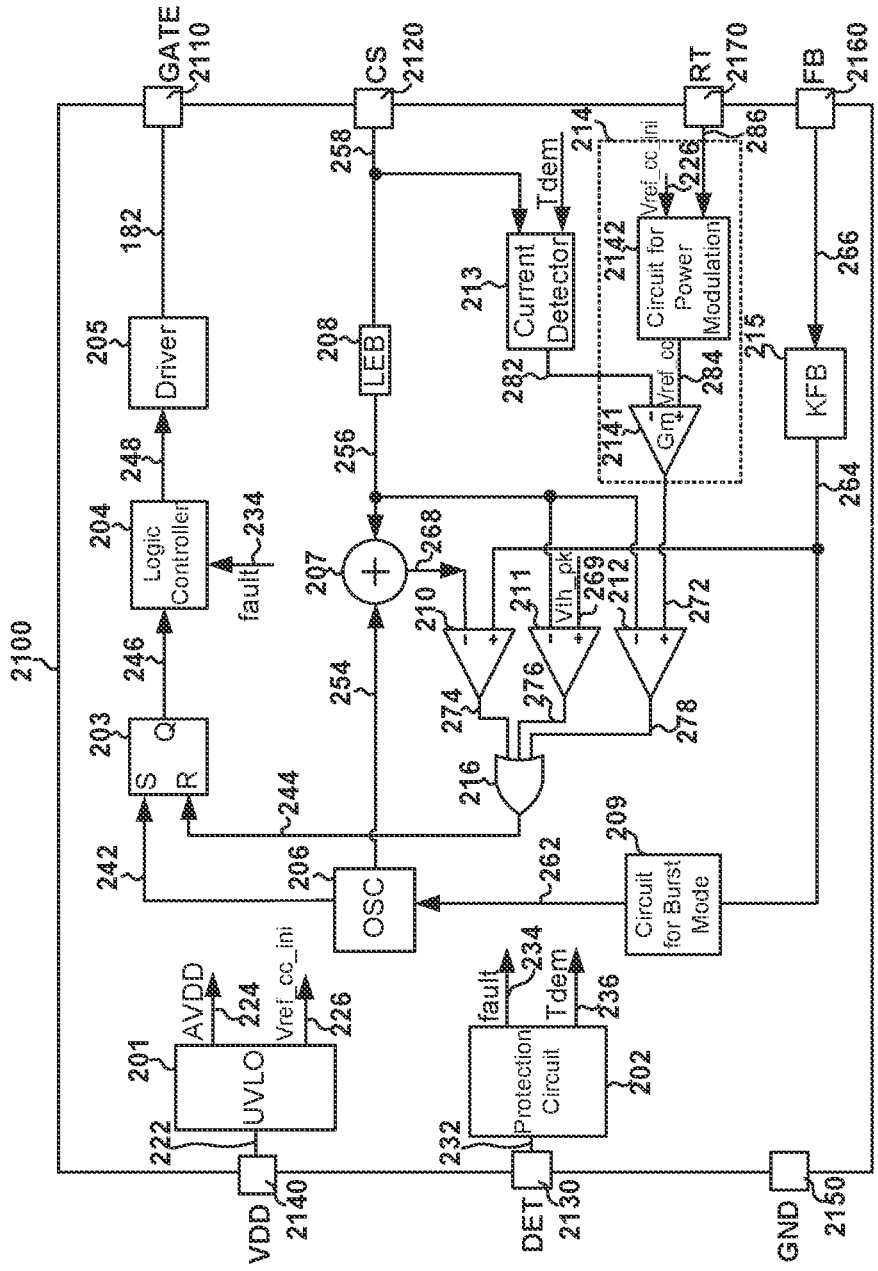
FIG. 2 is a simplified diagram showing the pulse-width-modulation (PWM) controller as part of the charging system as shown in FIG. 1 according to some embodiments of the present invention.

FIG. 2 is a simplified diagram showing the pulse-width-modulation (PWM) controller 2100 as part of the charging system 100 as shown in FIG. 1 according to some embodiments of the present invention. This diagram is merely an example, which should not unduly limit the scope of the claims. One of ordinary skill in the art would recognize many variations, alternatives, and modifications. The pulse-width-modulation (PWM) controller 2100 (e.g., a chip) includes the terminal 2110 (e.g., a GATE pin), the terminal 2120 (e.g., a CS pin), the terminal 2130 (e.g., a DET pin), the terminal 2140 (e.g., a VDD pin), the terminal 2150 (e.g., a GND pin), the terminal 2160 (e.g., an FB pin), and the terminal 2170 (e.g., an RT pin). Additionally, the pulse-width-modulation (PWM) controller 2100 (e.g., a chip) also includes a circuit 201 for undervoltage-lockout (UVLO), a protection circuit 202, a flip-flop 203, a logic controller 204, a driver 205, an oscillator 206, a circuit 207 for slope compensation, a circuit 208 for leading edge blanking (LEB), a circuit 209 for burst mode, a comparator 210 for pulse width modulation (PWM), a comparator 211 for overcurrent protection (OCP), a comparator 212 for constant current control, a current detector 213, a circuit 214 for temperature feedback, a voltage divider 215, and an OR gate 216. For example, the circuit 214 for temperature feedback includes an error amplifier 2141 and a circuit 2142 for power modulation. As an example, the pulse-width-modulation (PWM) controller 2100 (e.g., a chip) changes the current 2122 that flows through the resistor 116 based at least in part on the temperature detected through the terminal 2170 (e.g., an RT pin), in order to change the input power of the charging system 100. Although the above has been shown using a selected group of components for the pulse-width-modulation (PWM) controller 2100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the circuit 201 for undervoltage-lockout (UVLO) receives a signal 222 from the terminal 2140 (e.g., a VDD pin) and generates a signal 224 (e.g., AVDD) and a reference voltage 226 (e.g., Vref_cc_ini). For example, the protection circuit 202 receives a signal 232 from the terminal 2130 (e.g., a DET pin) and generates a signal 234 (e.g., fault) and a signal 236 (e.g., Tdem). As an example, the flip-flop 203 receives a signal 242 from the oscillator 206 and a signal 244 from the OR gate 216 and generates a signal 246. In some embodiments, the logic controller 204 receives the signal 246 from the flip-flop 203 and the signal 234 (e.g., fault) from the protection circuit 202 and generates a signal 248. For example, the driver 205 receives the signal 248 from the logic controller 204 and outputs the drive signal 182 (e.g., a PWM signal) through the terminal 2110 (e.g., a GATE pin).

According to some embodiments, the oscillator 206 generates the signal 242 and a signal 254. For example, the circuit 207 for slope compensation receives the signal 254 from the oscillator 206 and a signal 256 from the circuit 208 for leading edge blanking (LEB). As an example, the circuit 208 for leading edge blanking (LEB) receives a signal 258 through the terminal 2120 (e.g., a CS pin). According to certain embodiments, the oscillator 206 receives a signal 262 from the circuit 209 for burst mode. For example, the circuit 209 for burst mode receives a signal 264 from the voltage divider 215. As an example, the voltage divider 215 receives a signal 266 from the terminal 2160 (e.g., an FB pin).

In certain embodiments, the circuit 207 for slope compensation outputs a signal 268 to an inverting input terminal (e.g., the "−" terminal) of the comparator 210 for pulse width modulation (PWM). For example, a non-inverting input terminal (e.g., the "+" terminal) of the comparator 210 for pulse width modulation (PWM) receives the signal 264 from the voltage divider 215. In some embodiments, an inverting input terminal (e.g., the "−" terminal) of the comparator 211 for overcurrent protection (OCP) receives the signal 256 from the circuit 208 for leading edge blanking (LEB), and a non-inverting input terminal (e.g., the "+" terminal) of the comparator 211 for overcurrent protection (OCP) receives a reference voltage 269 (e.g., Vth_pk). In some embodiments, an inverting input terminal (e.g., the "−" terminal) of the comparator 212 for constant current control receives the signal 256 from the circuit 208 for leading edge blanking (LEB), and a non-inverting input terminal (e.g., the "+" terminal) of the comparator 212 for constant current control receives a signal 272 from the error amplifier 2141. For example, the comparator 210 for pulse width modulation (PWM) generates a signal 274, the comparator 211 for overcurrent protection (OCP) generates a signal 276, and the comparator 212 for constant current control generates a signal 278. As an example, the signal 274, the signal 276, and the signal 278 are received by the OR gate 216.

According to some embodiments, the current detector 213 receives the signal 258 through the terminal 2120 (e.g., a CS pin) and the signal 236 (e.g., Tdem) from the protection circuit 202 and generates a signal 282. For example, an inverting input terminal (e.g., the "−" terminal) of the error amplifier 2141 receives the signal 282 from the current detector 213. As an example, a non-inverting input terminal (e.g., the "+" terminal) of the error amplifier 2141 receives a reference voltage 284 (e.g., Vref_cc) from the circuit 2142 for power modulation.

According to certain embodiments, the circuit 2142 for power modulation receives the reference voltage 226 (e.g., Vref_cc_ini) from the circuit 201 for undervoltage-lockout (UVLO) and a voltage 286 through the terminal 2170 (e.g., an RT pin) and generates the reference voltage 284 (e.g., Vref_cc). For example, the circuit 2142 for power modulation detects the temperature based at least in part on the voltage 286. As an example, the circuit 2142 for power modulation changes the reference voltage 284 (e.g., Vref_cc) based at least in part on the detected temperature in order to change the pulse width of the drive signal 182 (e.g., a PWM signal) so that the current 2122 that flows through the resistor 116 is also changed.

In some embodiments, the charging system 100 that includes the pulse-width-modulation (PWM) controller 2100 modulates the reference voltage 284 (e.g., Vref_cc) based at least in part on the temperature of the resistor 128 and also adjusts the input power in order to avoid excessive temperature rise caused by fast charging of the load 190 (e.g., a Type-C device). For example, the resistor 128 is on the primary side of the charging system 100, and the temperature of the resistor 128 represents the temperature on the primary side of the charging system 100. In certain embodiments, the reference voltage 284 (e.g., Vref_cc) is used to adjust the pulse width of the drive signal 182 (e.g., a PWM signal) and to control the peak magnitude of the input current that flows through the primary winding 104 of the transformer 102 (e.g., T2). For example, if the peak magnitude of the input current that flows through the primary winding 104 decreases, the input power of the charging system 100 also decreases. As an example, if the peak magnitude of the input current that flows through the primary winding 104 increases, the input power of the charging system 100 also increases. In some embodiments, the pulse-width-modulation (PWM) controller 2100 (e.g., a chip) not only changes the input power of the charging system 100 based at least in part on the temperature of the resistor 128 but also changes the output power of the charging system 100 based at least in part on the temperature of the resistor 128 by changing the input power. For example, if the peak magnitude of the input current that flows through the primary winding 104 decreases, the input power of the charging system 100 decreases and the output power of the charging system 100 also decreases. As an example, if the peak magnitude of the input current that flows through the primary winding 104 increases, the input power of the charging system 100 increases and the output power of the charging system 100 also increases.

Figure 3:
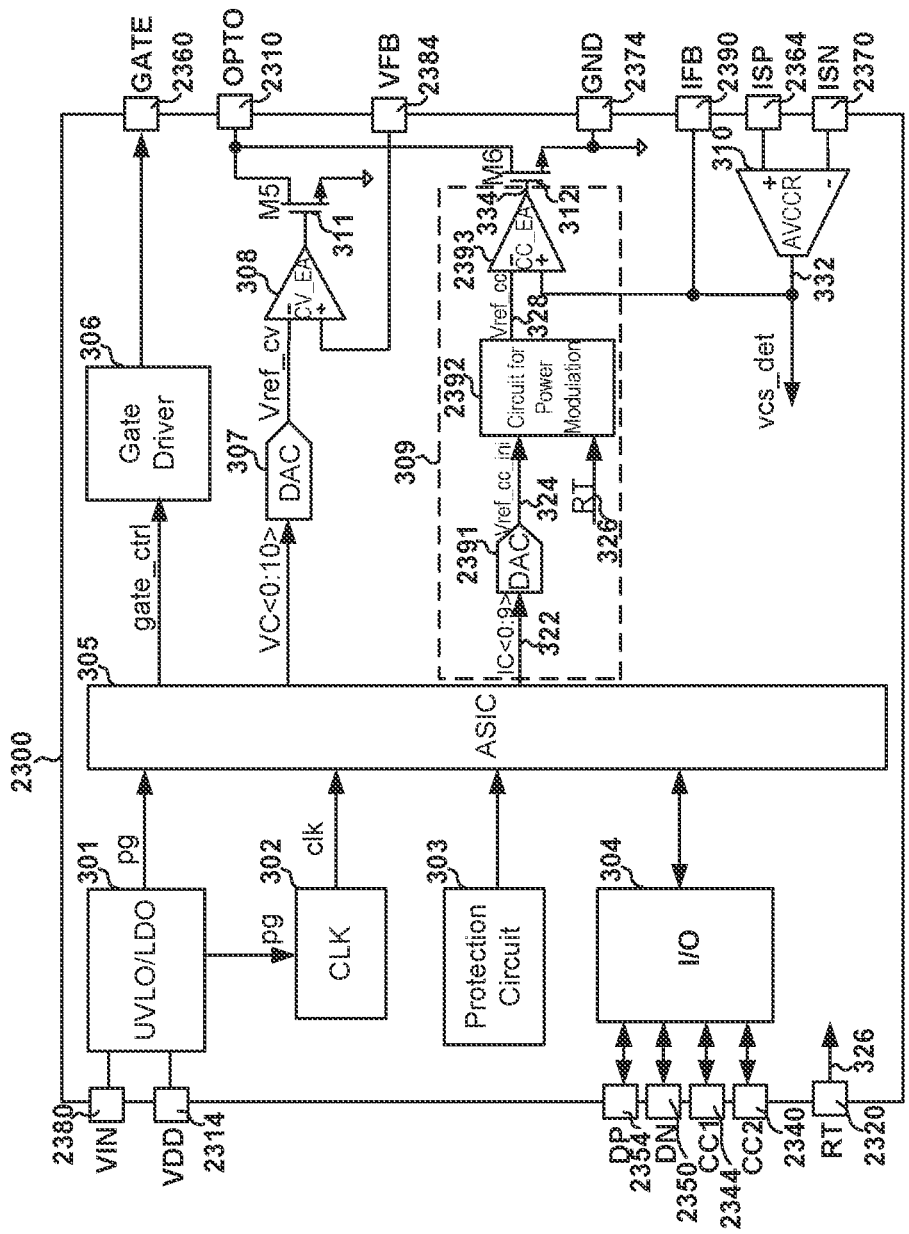
FIG. 3 is a simplified diagram showing the charging controller as part of the charging system as shown in FIG. 1 according to some embodiments of the present invention.

FIG. 3 is a simplified diagram showing the charging controller 2300 as part of the charging system 100 as shown in FIG. 1 according to some embodiments of the present invention. This diagram is merely an example, which should not unduly limit the scope of the claims. One of ordinary skill in the art would recognize many variations, alternatives, and modifications. The charging controller 2300 (e.g., a chip) includes the terminal 2310 (e.g., an OPTO pin), the terminal 2314 (e.g., a VDD pin), the terminal 2320 (e.g., an RT pin), the terminal 2340 (e.g., a CC2 pin), the terminal 2344 (e.g., a CC1 pin), the terminal 2350 (e.g., a DN pin), the terminal 2354 (e.g., a DP pin), the terminal 2360 (e.g., a GATE pin), the terminal 2364 (e.g., an ISP pin), the terminal 2370 (e.g., an ISN pin), the terminal 2374 (e.g., a GND pin), the terminal 2380 (e.g., a VIN pin), the terminal 2384 (e.g., a VFB pin), and the terminal 2390 (e.g., an IFB pin). Additionally, the charging controller 2300 (e.g., a chip) includes a circuit 301 for undervoltage-lockout (UVLO) and low-dropout (LUDO) regulator, a clock 302, a protection circuit 303, an input/output circuit 304, an application specific integrated circuit (ASIC) 305 (e.g., a microcontroller unit), a gate driver 306, a digital-to-analog converter (DAC) 307, an error amplifier 308 (e.g., CV_EA), a circuit 309 for temperature feedback, an output current amplifier 310 (e.g., AVCCR), a transistor 311 (e.g., M5), and a transistor 312 (e.g., M6). For example, the circuit 309 for temperature feedback includes a digital-to-analog converter (DAC) 2391, a circuit 2392 for power modulation, and an error amplifier 2393 (e.g., CC_EA). As an example, the charging controller 2300 (e.g., a chip) changes the current 2372 that flows through the resistor 194 (e.g., $R_{sense}$) based at least in part on the temperature detected through the terminal 2320 (e.g., an RT pin), in order to change the output power of the charging system 100. Although the above has been shown using a selected group of components for the charging controller 2300, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the circuit 301 for undervoltage-lockout (UVLO) and low-dropout (LDO) regulator includes two input terminals, which are connected to the terminal 2380 (e.g., a VIN pin) and the terminal 2314 (e.g., a VDD pin) respectively. As an example, the circuit 301 for undervoltage-lockout (UVLO) and low-dropout (LDO) regulator sends an output signal (e.g., pg) through an output terminal to the ASIC 305 (e.g., a microcontroller unit) and also sends the output signal (e.g., pg) through another output terminal to the clock 302. For example, the clock 302 generates a clock signal (e.g., clk) and sends the clock signal (e.g., clk) through an output terminal to the ASIC 305 (e.g., a microcontroller unit).

According to some embodiments, the protection circuit 303 generates and sends a protection signal through an output terminal to the ASIC 305 (e.g., a microcontroller unit). In certain examples, the input/output circuit 304 are coupled to the terminal 2354 (e.g., a DP pin), the terminal 2350 (e.g., a DN pin), the terminal 2344 (e.g., a CC1 pin), the terminal 2340 (e.g., a CC2 pin), and the ASIC 305 (e.g., a microcontroller unit). In some examples, the detection circuit 303 sends a signal to the ASIC 305 (e.g., a microcontroller unit). In certain examples, the gate driver 306 receives a signal (e.g., gate_ctrl) from the ASIC 305 (e.g., a microcontroller unit) and sends a drive signal to the terminal 2360 (e.g., a GATE pin).

In certain embodiments, the digital-to-analog converter (DAC) 307 receives a signal (e.g., VC<0:10>) from the ASIC 305 (e.g., a microcontroller unit) and sends a signal (e.g., Vref_cv) to an inverting input terminal (e.g., a "−" terminal) of the error amplifier 308 (e.g., CV_EA). For example, a non-inverting input terminal (e.g., a "+" terminal) of the error amplifier 308 (e.g., CV_EA) also receives a signal from the terminal 2384 (e.g., a VFB pin), and an output terminal of the error amplifier 308 (e.g., CV_EA) sends a signal to the gate of the transistor 311 (e.g., M5). As an example, the drain of the transistor 311 (e.g., M5) is connected to the terminal 2310 (e.g., an OPTO pin), and the source of the transistor 311 (e.g., M5) is biased to the ground voltage on the secondary side of the charging system 100.

In some embodiments, the digital-to-analog converter (DAC) 2391 receives a signal 322 (e.g., IC<0:9>) from the ASIC 305 (e.g., a microcontroller unit) and sends a reference voltage 324 (e.g., Vref_cc_ini) to the circuit 2392 for power modulation, which also receives a voltage 326 from the terminal 2320 (e.g., an RT pin). In certain examples, the circuit 2392 for power modulation generates a reference voltage 328 (e.g., Vref_cc) based at least in part on the reference voltage 324 (e.g., Vref_cc_ini) and the voltage 326. For example, the circuit 2392 for power modulation detects the temperature based at least in part on the voltage 326. As an example, the circuit 2392 for power modulation changes the reference voltage 328 (e.g., Vref_cc) based at least in part on the detected temperature in order to change the current 2372 that flows through the resistor 194 (e.g., $R_{sense}$).

In some examples, the reference voltage 328 (e.g., Vref_cc) is received by an inverting input terminal (e.g., a "−" terminal) of the error amplifier 2393 (e.g., CC_EA). For example, a non-inverting input terminal (e.g., a "+" terminal) of the error amplifier 2393 (e.g., CC_EA) is a signal 332 (e.g., vcs_det) from the output current amplifier 310 (e.g., AVCCR). As an example, the signal 332 (e.g., vcs_det) is also received by the terminal 2390 (e.g., an IFB pin). In certain examples, an output terminal of the error amplifier 2393 (e.g., CC_EA) sends a signal 334 to the gate of the transistor 312 (e.g., M6). For example, the drain of the transistor 312 (e.g., M6) is connected to the terminal 2310 (e.g., an OPTO pin), and the source of the transistor 312 (e.g., M6) is biased to the ground voltage on the secondary side of the charging system 100. For example, the terminal 2374 (e.g., a GND pin) is also biased to the ground voltage on the secondary side of the charging system 100.

According to certain embodiments, the output current amplifier 310 (e.g., AVCCR) includes a non-inverting input terminal (e.g., a "+" terminal) coupled to the terminal 2364 (e.g., an ISP pin) and also includes an inverting input terminal (e.g., a "−" terminal) coupled to the terminal 2370 (e.g., an ISN pin). For example, the voltage drop from the terminal 2364 (e.g., an ISP pin) to the terminal 2370 (e.g., an ISN pin) represents the voltage drop across the resistor 194 (e.g., $R_{sense}$) caused by the current 2372. In some examples, the output current amplifier 310 (e.g., AVCCR) includes an output terminal that sends the signal 332 (e.g., vcs_det) to the non-inverting input terminal (e.g., a "+" terminal) of the error amplifier 2393 (e.g., CC_EA) and to the terminal 2390 (e.g., an IFB pin). As an example, the signal 332 (e.g., vcs_det) is equal to a predetermined amplification constant multiplied by the voltage drop from the terminal 2364 (e.g., an ISP pin) to the terminal 2370 (e.g., an ISN pin). For example, the signal 332 (e.g., vcs_det) is a voltage signal that indicates the magnitude of the current 2372 that flows through the resistor 194 (e.g., $R_{sense}$).

According to some embodiments, the charging controller 2300 (e.g., a chip) communicates, through the terminal 2354 (e.g., a DP pin), the terminal 2350 (e.g., a DN pin), the terminal 2344 (e.g., a CC1 pin) and the terminal 2340 (e.g., a CC2 pin), with the load 190 (e.g., a Type-C device) that is to be charged. In some examples, the charging controller 2300 (e.g., a chip) sends one or more notification signals to inform the load 190 (e.g., a Type-C device) of the voltage, the current, and/or the power supported by the charging controller 2300 (e.g., a chip). For example, the charging controller 2300 (e.g., a chip) responds to the voltage and/or the current requested by the load 190 (e.g., a Type-C device) that is to be charged. In certain examples, the charging controller 2300 (e.g., a chip) monitors for one or more abnormal conditions (e.g., a voltage condition, a current condition, and/or a temperature condition) in real time. As an example, the charging controller 2300 (e.g., a chip) causes the transistor 140 (e.g., a transistor M3) to be turned off and/or causes a capacitor related to a charging voltage (e.g., VBUS) to be discharged in order to protect the load 190 (e.g., a Type-C device) from damage.

In certain embodiments, the charging system 100 that includes the charging controller 2300 modulates the reference voltage 328 (e.g., Vref_cc) based at least in part on the temperature of the resistor 138 and also adjusts the output power in order to avoid excessive temperature rise caused by fast charging of the load 190 (e.g., a Type-C device). For example, the resistor 138 is on the secondary side of the charging system 100, and the temperature of the resistor 138 represents the temperature on the secondary side of the charging system 100.

In some embodiments, the reference voltage 328 (e.g., Vref_cc) is used to control the magnitude of the current that flows through the transistor 312 (e.g., M6). For example, if the reference voltage 328 (e.g., Vref_cc) becomes lower, the signal 334 that is generated by the error amplifier 2393 (e.g., CC_EA) and received by the gate of the transistor 312 (e.g., M6) becomes larger in magnitude, and the current that flows into the charging controller 2300 (e.g., a chip) through the terminal 2310 (e.g., an OPTO pin) and the transistor 312 (e.g., M6) also becomes larger in magnitude. As an example, if the reference voltage 328 (e.g., Vref_cc) becomes higher, the signal 334 that is generated by the error amplifier 2393 (e.g., CC_EA) and received by the gate of the transistor 312 (e.g., M6) becomes smaller in magnitude, and the current that flows into the charging controller 2300 (e.g., a chip) through the terminal 2310 (e.g., an OPTO pin) and the transistor 312 (e.g., M6) becomes smaller in magnitude. In certain examples, when the current that flows through the transistor 312 (e.g., M6) increases in magnitude, a diode current that flows through the light emitting diode 156 of the optocoupler increases and a detection current that flows through the photosensitive detector 158 of the optocoupler also increases, causing a feedback voltage that is generated by the photosensitive detector 158 of the optocoupler and is received by the terminal 2160 (e.g., an FB pin) to decrease. For example, when the feedback voltage that is received by the terminal 2160 (e.g., an FB pin) decreases, the pulse-width-modulation (PWM) controller 2100 reduces the pulse width of the drive signal 182 (e.g., a PWM signal) and also reduces the duty cycle of the drive signal 182 (e.g., a PWM signal), causing the peak magnitude of the input current that flows through the primary winding 104 of the transformer 102 (e.g., T2) to decrease. As an example, if the peak magnitude of the input current that flows through the primary winding 104 decreases, both the input power and the output power of the charging system 100 decrease. In some examples, when the current that flows through the transistor 312 (e.g., M6) decreases in magnitude, the diode current that flows through the light emitting diode 156 of the optocoupler decreases and the detection current that flows through the photosensitive detector 158 of the optocoupler also decreases, causing the feedback voltage that is generated by the photosensitive detector 158 of the optocoupler and is received by the terminal 2160 (e.g., an FB pin) to increase. For example, when the feedback voltage that is received by the terminal 2160 (e.g., an FB pin) increases, the pulse-width-modulation (PWM) controller 2100 increases the pulse width of the drive signal 182 (e.g., a PWM signal) and also increases the duty cycle of the drive signal 182 (e.g., a PWM signal), causing the peak magnitude of the input current that flows through the primary winding 104 of the transformer 102 (e.g., T2) to increase. As an example, if the peak magnitude of the input current that flows through the primary winding 104 increases, both the input power and the output power of the charging system 100 increase.

In certain embodiments, the charging controller 2300 changes the output power of the charging system 100 based at least in part on the temperature of the resistor 138 by using the optocoupler and the pulse-width-modulation (PWM) controller 2100 to change the peak magnitude of the input current that flows through the primary winding 104 and change the input power of the charging system 100 based at least in part on the temperature of the resistor 138. For example, the charging controller 2300 changes both the input power and the output power of the charging system 100 based at least in part on the temperature of the resistor 138.

Figure 4:
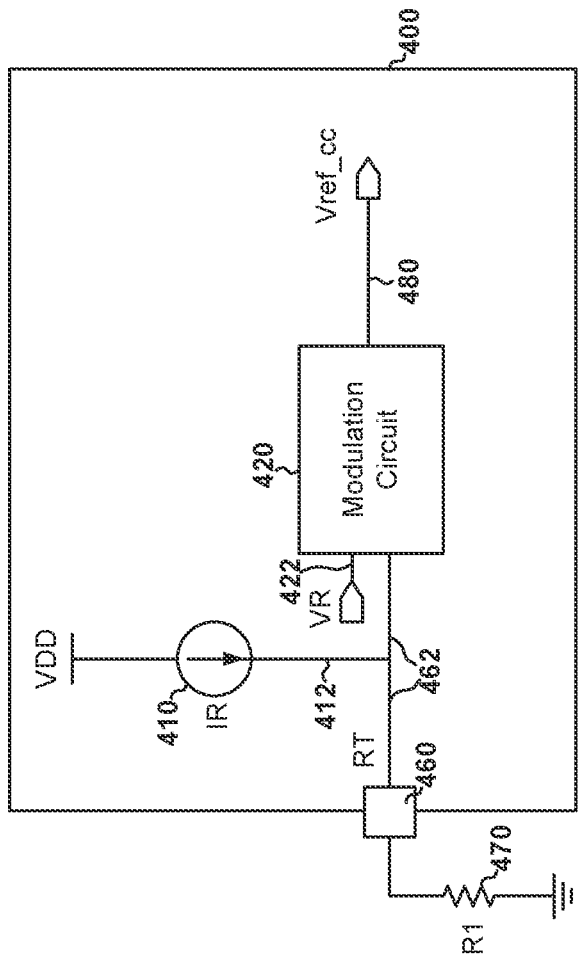
FIG. 4 is a simplified diagram showing a circuit for power modulation as part of the pulse-width-modulation (PWM) controller of the charging system as shown in FIG. 1 and FIG. 2 and/or as part of the charging controller of the charging system as shown in FIG. 1 and FIG. 3 according to some embodiments of the present invention.

FIG. 4 is a simplified diagram showing a circuit for power modulation as part of the pulse-width-modulation (PWM) controller 2100 of the charging system 100 as shown in FIG. 1 and FIG. 2 and/or as part of the charging controller 2300 of the charging system 100 as shown in FIG. 1 and FIG. 3 according to some embodiments of the present invention. This diagram is merely an example, which should not unduly limit the scope of the claims. One of ordinary skill in the art would recognize many variations, alternatives, and modifications. The circuit 400 for power modulation includes a current source 410 and a modulation circuit 420. For example, the circuit 400 for power modulation is the circuit 2142 for power modulation. As an example, the circuit 400 for power modulation is the circuit 2392 for power modulation. Although the above has been shown using a selected group of components for the circuit 400 for power modulation, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the current source 410 receives a supply voltage (e.g., VDD) and generates a current 412, and the current 412 flows through a terminal 460 (e.g., an RT pin) to a resistor 470 (e.g., R1). For example, the terminal 460 (e.g., an RT pin) is the terminal 2170 (e.g., an RT pin), and the resistor 470 (e.g., R1) is the resistor 128. As an example, the terminal 460 (e.g., an RT pin) is the terminal 2320 (e.g., an RT pin), and the resistor 470 (e.g., R1) is the resistor 138. In some examples, the resistor 470 (e.g., R1) receives the current 412 and generates a voltage 462. For example, the voltage 462 is the voltage 286. As an example, the voltage 462 is the voltage 326. In certain examples, the resistance of the resistor 470 decreases with the increasing temperature of the resistor 470, and the resistance of the resistor 470 increases with the decreasing temperature of the resistor 470. For example, if the temperature of the resistor 470 increases, the voltage 462 decreases. As an example, if the temperature of the resistor 470 decreases, the voltage 462 increases.

In some embodiments, the modulation circuit 420 receives a threshold voltage 422 (e.g., VR) and the voltage 462. In certain examples, the modulation circuit 420 generates a voltage 480 (e.g., Vref_cc) based at least in part on the threshold voltage 422 (e.g., VR) and the voltage 462. For example, the voltage 480 (e.g., Vref_cc) is the reference voltage 284 (e.g., Vref_cc). As an example, the voltage 480 (e.g., Vref_cc) is the reference voltage 328 (e.g., Vref_cc). According to some embodiments, if the voltage 462 is smaller than the threshold voltage 422 (e.g., VR), the voltage 480 (e.g., Vref_cc) changes with the voltage 462. According to certain embodiments, if the voltage 462 is larger than the threshold voltage 422 (e.g., VR), the voltage 480 (e.g., Vref_cc) is equal to a predetermined voltage. For example, the predetermined voltage is the reference voltage 226 (e.g., Vref_cc_ini). As an example, the predetermined voltage is the reference voltage 324 (e.g., Vref_cc_ini). In some examples, the voltage 480 (e.g., Vref_cc) is changed with the voltage 462 in order to modulate the input power and/or the output power of the charging system 100.

Figure 5:
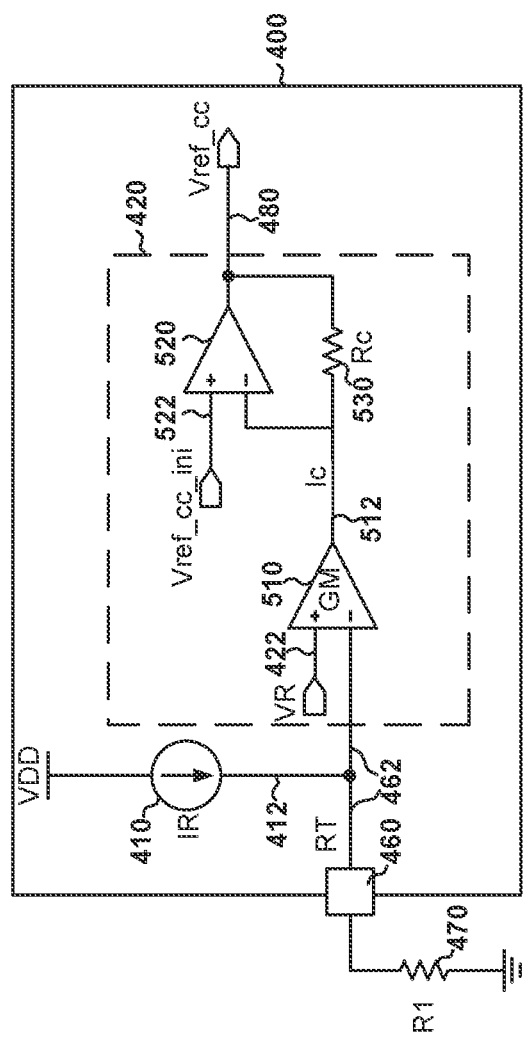
FIG. 5 is a simplified diagram showing certain components of the circuit for power modulation as shown in FIG. 4 as part of the pulse-width-modulation (PWM) controller of the charging system as shown in FIG. 1 and FIG. 2 and/or as part of the charging controller of the charging system as shown in FIG. 1 and FIG. 3 according to some embodiments of the present invention.

FIG. 5 is a simplified diagram showing certain components of the circuit 400 for power modulation as shown in FIG. 4 as part of the pulse-width-modulation (PWM) controller 2100 of the charging system 100 as shown in FIG. 1 and FIG. 2 and/or as part of the charging controller 2300 of the charging system 100 as shown in FIG. 1 and FIG. 3 according to some embodiments of the present invention. This diagram is merely an example, which should not unduly limit the scope of the claims. One of ordinary skill in the art would recognize many variations, alternatives, and modifications. The circuit 400 for power modulation includes the current source 410 and the modulation circuit 420, and the modulation circuit 420 includes a transconductance amplifier 510, an operational amplifier 520, and a resistor 530. For example, the circuit 400 for power modulation is the circuit 2142 for power modulation. As an example, the circuit 400 for power modulation is the circuit 2392 for power modulation. Although the above has been shown using a selected group of components for the circuit 400 for power modulation, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the current source 410 receives a supply voltage (e.g., VDD) and generates the current 412, and the current 412 flows through the terminal 460 (e.g., an RT pin) to the resistor 470 (e.g., R1). For example, the terminal 460 (e.g., an RT pin) is the terminal 2170 (e.g., an RT pin), and the resistor 470 (e.g., R1) is the resistor 128. As an example, the terminal 460 (e.g., an RT pin) is the terminal 2320 (e.g., an RT pin), and the resistor 470 (e.g., R1) is the resistor 138. In some examples, the resistor 470 (e.g., R1) receives the current 412 and generates the voltage 462. For example, the voltage 462 is the voltage 286. As an example, the voltage 462 is the voltage 326. In certain examples, the resistance of the resistor 470 decreases with the increasing temperature of the resistor 470, and the resistance of the resistor 470 increases with the decreasing temperature of the resistor 470. For example, if the temperature of the resistor 470 increases, the voltage 462 decreases. As an example, if the temperature of the resistor 470 decreases, the voltage 462 increases.

In some embodiments, the modulation circuit 420 receives the threshold voltage 422 (e.g., VR) and the voltage 462. In certain examples, the modulation circuit 420 generates a voltage 480 (e.g., Vref_cc) based at least in part on the threshold voltage 422 (e.g., VR) and the voltage 462. For example, the voltage 480 (e.g., Vref_cc) is the reference voltage 284 (e.g., Vref_cc). As an example, the voltage 480 (e.g., Vref_cc) is the reference voltage 328 (e.g., Vref_cc). According to some embodiments, if the voltage 462 is smaller than the threshold voltage 422 (e.g., VR), the voltage 480 (e.g., Vref_cc) changes with the voltage 462. According to certain embodiments, if the voltage 462 is larger than the threshold voltage 422 (e.g., VR), the voltage 480 (e.g., Vref_cc) is equal to a predetermined voltage 522 (e.g., Vref_cc_ini). For example, the predetermined voltage 522 (e.g., Vref_cc_ini) is the reference voltage 226 (e.g., Vref_cc_ini). As an example, the predetermined voltage 522 (e.g., Vref_cc_ini) is the reference voltage 324 (e.g., Vref_cc_ini). In some examples, the voltage 480 (e.g., Vref_cc) is changed with the voltage 462 in order to modulate the input power and/or the output power of the charging system 100.

As shown in FIG. 5, the modulation circuit 420 includes the transconductance amplifier 510 (e.g., GM), the operational amplifier 520, and the resistor 530 (e.g., Rc) according to certain embodiments. For example, a non-inverting input terminal (e.g., a "+" terminal) of the transconductance amplifier 510 (e.g., GM) receives the threshold voltage 422 (e.g., VR), and an inverting input terminal (e.g., a "−" terminal) of the transconductance amplifier 510 (e.g., GM) receives the voltage 462. As an example, based at least in part on the threshold voltage 422 (e.g., VR) and the voltage 462, the transconductance amplifier 510 (e.g., GM) generates a current 512 (e.g., Ic) at an output terminal of the transconductance amplifier 510 (e.g., GM). In some examples, the output terminal of the transconductance amplifier 510 (e.g., GM) is connected to an inverting input terminal (e.g., a "−" terminal) of the operational amplifier 520 and one terminal of the resistor 530 (e.g., Rc). For example, the resistor 530 (e.g., Rc) also includes another terminal, which is connected to an output terminal of the operational amplifier 520. As an example, the current 612 (e.g., Ic) is allowed to flow out of the output terminal of the transconductance amplifier 610 (e.g., GM) and is also allowed to flow into the output terminal of the transconductance amplifier 610 (e.g., GM). In certain examples, a non-inverting input terminal (e.g., a "+" terminal) of the operational amplifier 520 receives the predetermined voltage 522 (e.g., Vref_cc_ini). According to some embodiments, the operational amplifier 520 generates the voltage 480 (e.g., Vref_cc) and outputs the voltage 480 (e.g., Vref_cc) at the output terminal of the operational amplifier 520.

In certain embodiments, as shown in FIG. 5, the terminal 460 (e.g., an RT pin) is biased at the voltage 462 as follows:

$$V_{rt\_n} = I_R \times R_{ntc} \quad \text{(Equation 1)}$$

where $V_{rt\_n}$ represents the voltage 462. Additionally, $I_R$ represents the current 412, and $R_{ntc}$ represents the resistance of the resistor 470 (e.g., R1). For example, $I_R$ remains approximately constant regardless of temperature. As an example, $R_{ntc}$ decreases with the increasing temperature of the resistor 470, and $R_{ntc}$ increases with the decreasing temperature of the resistor 470. In some embodiments, $V_{rt\_n}$ decreases with the increasing temperature of the resistor 470, and $V_{rt\_n}$ increases with the decreasing temperature of the resistor 470. For example, the voltage 462 (e.g., $V_{rt\_n}$) depends on the temperature of the resistor 470. As an example, the voltage 462 (e.g., $V_{rt\_n}$) is used to detect the temperature of the resistor 470.

According to some embodiments, based at least in part on the threshold voltage 422 (e.g., VR) and the voltage 462, the transconductance amplifier 510 (e.g., GM) generates the current 512 (e.g., Ic) at the output terminal of the transconductance amplifier 510 (e.g., GM) as follows:

$$I_c = G_m \times (V_R - V_{rt\_n}) \quad \text{(Equation 2)}$$

where $I_c$ represents the current 512, and $G_m$ represents the transconductance of the transconductance amplifier 510. Additionally, $V_R$ represents the threshold voltage 422, and $V_{rt\_n}$ represents the voltage 462. For example, if $V_R$ is larger than $V_{rt\_n}$, $I_c$ is larger than zero and the current 512 flows out of the output terminal of the transconductance amplifier 510. As an example, if $V_R$ is smaller than $V_{rt\_n}$, $I_c$ is smaller than zero and the current 512 flows into the output terminal of the transconductance amplifier 510.

According to certain embodiments, based at least in part on the current 512 (e.g., Ic) and the predetermined voltage 522 (e.g., Vref_cc_ini), the operational amplifier 520 generates the voltage 480 (e.g., Vref_cc) as follows:

$$V_{ref\_cc} = V_{ref\_cc\_ini} - I_c \times R_c \quad \text{(Equation 3)}$$

where $V_{ref\_cc}$ represents the voltage 480, and $V_{ref\_cc\_ini}$ represents the predetermined voltage 522. Additionally, $I_c$ represents the current 512, and $R_c$ represents the resistance of the resistor 530.

In some embodiments, by combining Equations 1, 2 and 3, the voltage 480 is determined as follows:

$$V_{ref\_cc} = V_{ref\_cc\_ini} - G_m \times (V_R - I_R \times R_{ntc}) \times R_c \quad \text{(Equation 4)}$$

where $V_{ref\_cc}$ represents the voltage 480, and $V_{ref\_cc\_ini}$ represents the predetermined voltage 522. Additionally, $G_m$ represents the transconductance of the transconductance amplifier 510, and $V_R$ represents the threshold voltage 422. Also, $I_R$ represents the current 412, $R_{ntc}$ represents the resistance of the resistor 470, and $R_c$ represents the resistance of the resistor 530.

In certain embodiments, the temperature value of the resistor 470 (e.g., R1) at which the voltage 462 is equal to the threshold voltage 422 (e.g., VR) is a threshold temperature that corresponds to the threshold voltage 422 (e.g., VR). For example, if the temperature of the resistor 470 (e.g., R1) is lower than the threshold temperature, the threshold voltage 422 is smaller than the voltage 462 and the current 512 flows into the output terminal of the transconductance amplifier 510. As an example, if the temperature of the resistor 470 (e.g., R1) is equal to the threshold temperature, the threshold voltage 422 is equal to the voltage 462 and the current 512 is equal to zero in magnitude. For example, if the temperature of the resistor 470 (e.g., R1) is higher than the threshold temperature, the threshold voltage 422 is larger than the voltage 462 and the current 512 flows out of the output terminal of the transconductance amplifier 510.

In some embodiments, if the temperature of the resistor 470 (e.g., R1) is higher than the threshold temperature, the magnitude of the current 512 that flows out of the output terminal of the transconductance amplifier 510 increases with the increasing temperature but the voltage 480 decreases with the increasing temperature. For example, if the circuit 400 for power modulation is used as the circuit 2142 for power modulation of the PWM controller 2100 of the charging system 100, when the voltage 480 decreases, the input power of the charging system 100 also decreases, causing the temperature of the resistor 470 (e.g., the resistor 128) to reduce, until an equilibrium is achieved. As an example, if the circuit 400 for power modulation is used as the circuit 2392 for power modulation of the charging controller 2300 of the charging system 100, when the voltage 480 decreases, the output power of the charging system 100 also decreases, causing the temperature of the resistor 470 (e.g., the resistor 138) to reduce, until an equilibrium is achieved.

Figure 6:
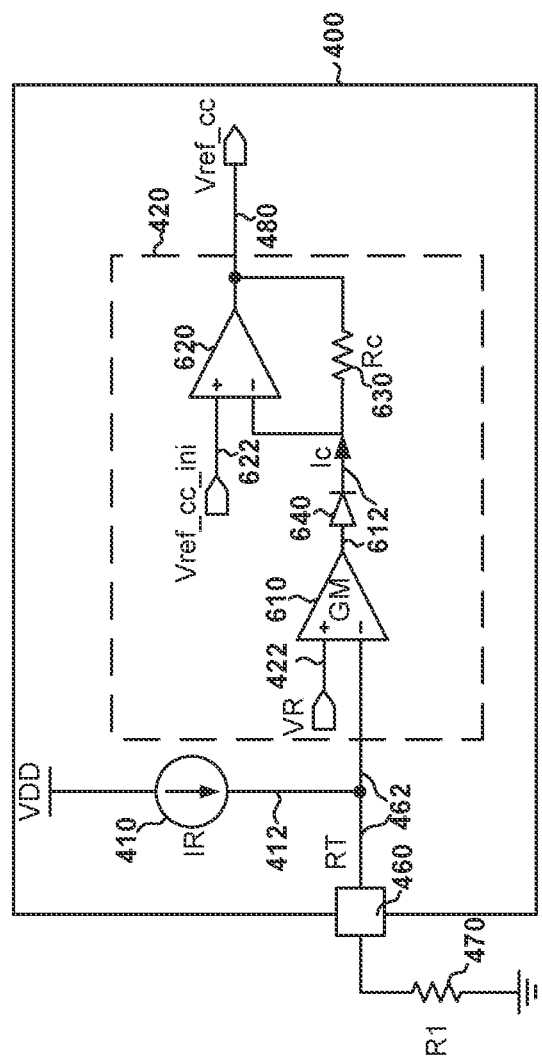
FIG. 6 is a simplified diagram showing certain components of the circuit for power modulation as shown in FIG. 4 as part of the pulse-width-modulation (PWM) controller of the charging system as shown in FIG. 1 and FIG. 2 and/or as part of the charging controller of the charging system as shown in FIG. 1 and FIG. 3 according to some embodiments of the present invention.

FIG. 6 is a simplified diagram showing certain components of the circuit 400 for power modulation as shown in FIG. 4 as part of the pulse-width-modulation (PWM) controller 2100 of the charging system 100 as shown in FIG. 1 and FIG. 2 and/or as part of the charging controller 2300 of the charging system 100 as shown in FIG. 1 and FIG. 3 according to some embodiments of the present invention. This diagram is merely an example, which should not unduly limit the scope of the claims. One of ordinary skill in the art would recognize many variations, alternatives, and modifications. The circuit 400 for power modulation includes the current source 410 and the modulation circuit 420, and the modulation circuit 420 includes a transconductance amplifier 610, an operational amplifier 620, a resistor 630, and a diode 640. For example, the circuit 400 for power modulation is the circuit 2142 for power modulation. As an example, the circuit 400 for power modulation is the circuit 2392 for power modulation. Although the above has been shown using a selected group of components for the circuit 400 for power modulation, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the current source 410 receives a supply voltage (e.g., VDD) and generates the current 412, and the current 412 flows through the terminal 460 (e.g., an RT pin) to the resistor 470 (e.g., R1). For example, the terminal 460 (e.g., an RT pin) is the terminal 2170 (e.g., an RT pin), and the resistor 470 (e.g., R1) is the resistor 128. As an example, the terminal 460 (e.g., an RT pin) is the terminal 2320 (e.g., an RT pin), and the resistor 470 (e.g., R1) is the resistor 138. In some examples, the resistor 470 (e.g., R1) receives the current 412 and generates the voltage 462. For example, the voltage 462 is the voltage 286. As an example, the voltage 462 is the voltage 326. In certain examples, the resistance of the resistor 470 decreases with the increasing temperature of the resistor 470, and the resistance of the resistor 470 increases with the decreasing temperature of the resistor 470. For example, if the temperature of the resistor 470 increases, the voltage 462 decreases. As an example, if the temperature of the resistor 470 decreases, the voltage 462 increases.

In some embodiments, the modulation circuit 420 receives the threshold voltage 422 (e.g., VR) and the voltage 462. In certain examples, the modulation circuit 420 generates a voltage 480 (e.g., Vref_cc) based at least in part on the threshold voltage 422 (e.g., VR) and the voltage 462. For example, the voltage 480 (e.g., Vref_cc) is the reference voltage 284 (e.g., Vref_cc). As an example, the voltage 480 (e.g., Vref_cc) is the reference voltage 328 (e.g., Vref_cc). According to some embodiments, if the voltage 462 is smaller than the threshold voltage 422 (e.g., VR), the voltage 480 (e.g., Vref_cc) changes with the voltage 462. According to certain embodiments, if the voltage 462 is larger than the threshold voltage 422 (e.g., VR), the voltage 480 (e.g., Vref_cc) is equal to a predetermined voltage 622 (e.g., Vref_cc_ini). For example, the predetermined voltage 622 (e.g., Vref_cc_ini) is the reference voltage 226 (e.g., Vref_cc_ini). As an example, the predetermined voltage 622 (e.g., Vref_cc_ini) is the reference voltage 324 (e.g., Vref_cc_ini). In some examples, the voltage 480 (e.g., Vref_cc) is changed with the voltage 462 in order to modulate the input power and/or the output power of the charging system 100.

As shown in FIG. 6, the modulation circuit 420 includes the transconductance amplifier 610 (e.g., GM), the operational amplifier 620, the resistor 630 (e.g., Rc), and the diode 640 according to certain embodiments. For example, a non-inverting input terminal (e.g., a "+" terminal) of the transconductance amplifier 610 (e.g., GM) receives the threshold voltage 422 (e.g., VR), and an inverting input terminal (e.g., a "−" terminal) of the transconductance amplifier 610 (e.g., GM) receives the voltage 462. As an example, based at least in part on the threshold voltage 422 (e.g., VR) and the voltage 462, the transconductance amplifier 610 (e.g., GM) generates a current 612 (e.g., Ic) at an output terminal of the transconductance amplifier 610 (e.g., GM). In some examples, the output terminal of the transconductance amplifier 610 (e.g., GM) is connected to an anode of the diode 640, and a cathode of the diode 640 is connected to an inverting input terminal (e.g., a "−" terminal) of the operational amplifier 620 and one terminal of the resistor 630 (e.g., Rc). For example, the resistor 630 (e.g., Rc) also includes another terminal, which is connected to an output terminal of the operational amplifier 620. As an example, with the diode 640, the current 612 (e.g., Ic) is allowed to flow out of the output terminal of the transconductance amplifier 610 (e.g., GM) but is not allowed to flow into the output terminal of the transconductance amplifier 610 (e.g., GM). In certain examples, a non-inverting input terminal (e.g., a "+" terminal) of the operational amplifier 620 receives the predetermined voltage 622 (e.g., Vref_cc_ini). According to some embodiments, the operational amplifier 620 generates the voltage 480 (e.g., Vref_cc) and outputs the voltage 480 (e.g., Vref_cc) at the output terminal of the operational amplifier 620.

In certain embodiments, as shown in FIG. 6, the terminal 460 (e.g., an RT pin) is biased at the voltage 462 as follows:

$$V_{rt\_n} = I_R \times R_{ntc} \quad \text{(Equation 5)}$$

where $V_{rt\_n}$ represents the voltage 462. Additionally, $I_R$ represents the current 412, and $R_{ntc}$ represents the resistance of the resistor 470 (e.g., R1). For example, $I_R$ remains approximately constant regardless of temperature. As an example, $R_{ntc}$ decreases with the increasing temperature of the resistor 470, and $R_{ntc}$ increases with the decreasing temperature of the resistor 470. In some embodiments, $V_{rt\_n}$ decreases with the increasing temperature of the resistor 470, and $V_{rt\_n}$ increases with the decreasing temperature of the resistor 470. For example, the voltage 462 (e.g., $V_{rt\_n}$) depends on the temperature of the resistor 470. As an example, the voltage 462 (e.g., $V_{rt\_n}$) is used to detect the temperature of the resistor 470.

According to some embodiments, if the threshold voltage 422 (e.g., VR) is larger than the voltage 462, the transconductance amplifier 610 (e.g., GM), together with the diode 640, generates the current 612 (e.g., Ic) as follows:

$$I_c = G_m \times (V_R - V_{rt\_n}) \quad \text{(Equation 6)}$$

where $I_c$ represents the current 612, and $G_m$ represents the transconductance of the transconductance amplifier 610. Additionally, $V_R$ represents the threshold voltage 422, and $V_{rt\_n}$ represents the voltage 462. For example, if $V_R$ is larger than $V_{rt\_n}$, $I_c$ is larger than zero and the current 612 flows out of the output terminal of the transconductance amplifier 510. As an example, if $V_R$ is smaller than $V_{rt\_n}$, the current 612 (e.g., $I_c$) is equal to zero in magnitude.

According to certain embodiments, if the threshold voltage 422 (e.g., VR) is larger than the voltage 462, based at least in part on the current 612 (e.g., Ic) and the predetermined voltage 622 (e.g., Vref_cc_ini), the operational amplifier 620 generates the voltage 480 (e.g., Vref_cc) as follows:

$$V_{ref\_cc} = V_{ref\_cc\_ini} - I_c \times R_c \quad \text{(Equation 7)}$$

where $V_{ref\_cc}$ represents the voltage 480, and $V_{ref\_cc\_ini}$ represents the predetermined voltage 622. Additionally, $I_c$ represents the current 612, and $R_c$ represents the resistance of the resistor 630.

In some embodiments, if the threshold voltage 422 (e.g., VR) is larger than the voltage 462, by combining Equations 5, 6 and 7, the voltage 480 is determined as follows:

$$V_{ref\_cc} = V_{ref\_cc\_ini} - G_m \times (V_R - I_R \times R_{ntc}) \times R_c \quad \text{(Equation 8)}$$

where $V_{ref\_cc}$ represents the voltage 480, and $V_{ref\_cc\_ini}$ represents the predetermined voltage 622. Additionally, $G_m$ represents the transconductance of the transconductance amplifier 610, and $V_R$ represents the threshold voltage 422. Also, $I_R$ represents the current 412, $R_{ntc}$ represents the resistance of the resistor 470, and $R_c$ represents the resistance of the resistor 630.

In certain embodiments, the temperature value of the resistor 470 (e.g., R1) at which the voltage 462 is equal to the threshold voltage 422 (e.g., VR) is a threshold temperature that corresponds to the threshold voltage 422 (e.g., VR). As an example, if the temperature of the resistor 470 (e.g., R1) is lower than or equal to the threshold temperature, the current 612 is equal to zero in magnitude. For example, if the temperature of the resistor 470 (e.g., R1) is higher than the threshold temperature, the current 612 flows out of the output terminal of the transconductance amplifier 610.

In some embodiments, if the temperature of the resistor 470 (e.g., R1) is higher than the threshold temperature, the magnitude of the current 612 that flows out of the output terminal of the transconductance amplifier 610 increases with the increasing temperature but the voltage 480 decreases with the increasing temperature. For example, if the circuit 400 for power modulation is used as the circuit 2142 for power modulation of the PWM controller 2100 of the charging system 100, when the voltage 480 decreases, the input power of the charging system 100 also decreases, causing the temperature of the resistor 470 (e.g., the resistor 128) to reduce, until an equilibrium is achieved. As an example, if the circuit 400 for power modulation is used as the circuit 2392 for power modulation of the charging controller 2300 of the charging system 100, when the voltage 480 decreases, the output power of the charging system 100 also decreases, causing the temperature of the resistor 470 (e.g., the resistor 138) to reduce, until an equilibrium is achieved.

In certain embodiments, if the temperature of the resistor 470 (e.g., R1) is lower than the threshold temperature, the magnitude of the current 612 is equal to zero and the voltage 480 is constant and equal to the predetermined voltage 622. For example, if the circuit 400 for power modulation is used as the circuit 2142 for power modulation of the PWM controller 2100 of the charging system 100, when the temperature of the resistor 470 (e.g., R1) is lower than the threshold temperature, the input power of the charging system 100 does not change with the temperature of the resistor 470 (e.g., the resistor 128). As an example, if the circuit 400 for power modulation is used as the circuit 2392 for power modulation of the charging controller 2300 of the charging system 100, when the temperature of the resistor 470 (e.g., R1) is lower than the threshold temperature, the output power of the charging system 100 does not change with the temperature of the resistor 470 (e.g., the resistor 138).

Figure 7:
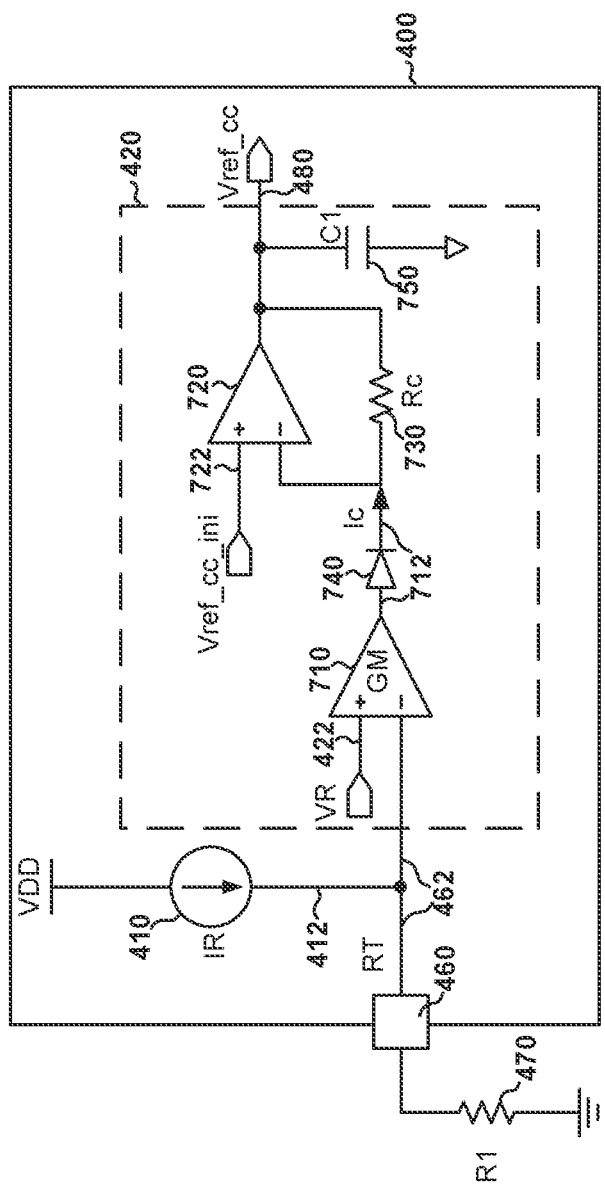
FIG. 7 is a simplified diagram showing certain components of the circuit for power modulation as shown in FIG. 4 as part of the pulse-width-modulation (PWM) controller of the charging system as shown in FIG. 1 and FIG. 2 and/or as part of the charging controller of the charging system as shown in FIG. 1 and FIG. 3 according to some embodiments of the present invention.

FIG. 7 is a simplified diagram showing certain components of the circuit 400 for power modulation as shown in FIG. 4 as part of the pulse-width-modulation (PWM) controller 2100 of the charging system 100 as shown in FIG. 1 and FIG. 2 and/or as part of the charging controller 2300 of the charging system 100 as shown in FIG. 1 and FIG. 3 according to some embodiments of the present invention. This diagram is merely an example, which should not unduly limit the scope of the claims. One of ordinary skill in the art would recognize many variations, alternatives, and modifications. The circuit 400 for power modulation includes the current source 410 and the modulation circuit 420, and the modulation circuit 420 includes a transconductance amplifier 710, an operational amplifier 720, a resistor 730, a diode 740, and a capacitor 750. For example, the circuit 400 for power modulation is the circuit 2142 for power modulation. As an example, the circuit 400 for power modulation is the circuit 2392 for power modulation. Although the above has been shown using a selected group of components for the circuit 400 for power modulation, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the current source 410 receives a supply voltage (e.g., VDD) and generates the current 412, and the current 412 flows through the terminal 460 (e.g., an RT pin) to the resistor 470 (e.g., R1). For example, the terminal 460 (e.g., an RT pin) is the terminal 2170 (e.g., an RT pin), and the resistor 470 (e.g., R1) is the resistor 128. As an example, the terminal 460 (e.g., an RT pin) is the terminal 2320 (e.g., an RT pin), and the resistor 470 (e.g., R1) is the resistor 138. In some examples, the resistor 470 (e.g., R1) receives the current 412 and generates the voltage 462. For example, the voltage 462 is the voltage 286. As an example, the voltage 462 is the voltage 326. In certain examples, the resistance of the resistor 470 decreases with the increasing temperature of the resistor 470, and the resistance of the resistor 470 increases with the decreasing temperature of the resistor 470. For example, if the temperature of the resistor 470 increases, the voltage 462 decreases. As an example, if the temperature of the resistor 470 decreases, the voltage 462 increases.

In some embodiments, the modulation circuit 420 receives the threshold voltage 422 (e.g., VR) and the voltage 462. In certain examples, the modulation circuit 420 generates a voltage 480 (e.g., Vref_cc) based at least in part on the threshold voltage 422 (e.g., VR) and the voltage 462. For example, the voltage 480 (e.g., Vref_cc) is the reference voltage 284 (e.g., Vref_cc). As an example, the voltage 480 (e.g., Vref_cc) is the reference voltage 328 (e.g., Vref_cc). According to some embodiments, if the voltage 462 is smaller than the threshold voltage 422 (e.g., VR), the voltage 480 (e.g., Vref_cc) changes with the voltage 462. According to certain embodiments, if the voltage 462 is larger than the threshold voltage 422 (e.g., VR), the voltage 480 (e.g., Vref_cc) is equal to a predetermined voltage 722 (e.g., Vref_cc_ini). For example, the predetermined voltage 722 (e.g., Vref_cc_ini) is the reference voltage 226 (e.g., Vref_cc_ini). As an example, the predetermined voltage 722 (e.g., Vref_cc_ini) is the reference voltage 324 (e.g., Vref_cc_ini). In some examples, the voltage 480 (e.g., Vref_cc) is changed with the voltage 462 in order to modulate the input power and/or the output power of the charging system 100.

As shown in FIG. 7, the modulation circuit 420 includes the transconductance amplifier 710 (e.g., GM), the operational amplifier 720, the resistor 730 (e.g., Rc), the diode 740, and the capacitor 750 (e.g., C1) according to certain embodiments. For example, a non-inverting input terminal (e.g., a "+" terminal) of the transconductance amplifier 710 (e.g., GM) receives the threshold voltage 422 (e.g., VR), and an inverting input terminal (e.g., a "−" terminal) of the transconductance amplifier 710 (e.g., GM) receives the voltage 462. As an example, based at least in part on the threshold voltage 422 (e.g., VR) and the voltage 462, the transconductance amplifier 710 (e.g., GM) generates a current 612 (e.g., Ic) at an output terminal of the transconductance amplifier 710 (e.g., GM). In some examples, the output terminal of the transconductance amplifier 710 (e.g., GM) is connected to an anode of the diode 740, and a cathode of the diode 740 is connected to an inverting input terminal (e.g., a "−" terminal) of the operational amplifier 720 and one terminal of the resistor 730 (e.g., Rc). For example, the resistor 730 (e.g., Rc) also includes another terminal, which is connected to an output terminal of the operational amplifier 720. As an example, with the diode 740, the current 712 (e.g., Ic) is allowed to flow out of the output terminal of the transconductance amplifier 710 (e.g., GM) but is not allowed to flow into the output terminal of the transconductance amplifier 710 (e.g., GM). In certain examples, a non-inverting input terminal (e.g., a "+" terminal) of the operational amplifier 720 receives the predetermined voltage 722 (e.g., Vref_cc_ini).

According to some embodiments, the output terminal of the operational amplifier 620 is connected to one terminal of the capacitor 750 (e.g., C1). In certain examples, the capacitor 750 (e.g., C1) also includes another terminal at a predetermined bias voltage. For example, the predetermined bias voltage is the ground voltage on the primary side of the charging system 100 if the circuit 400 for power modulation is used as the circuit 2142 for power modulation. As an example, the predetermined bias voltage is the ground voltage on the secondary side of the charging system 100 if the circuit 400 for power modulation is used as the circuit 2392 for power modulation. In some examples, the operational amplifier 620, together with the capacitor 750 (e.g., C1), generates the voltage 480 (e.g., Vref_cc). As an example, the capacitor 750 (e.g., C1) is used to prevent interference.

In certain embodiments, as shown in FIG. 7, the terminal 460 (e.g., an RT pin) is biased at the voltage 462 as follows:

$$V_{rt\_n} = I_R \times R_{ntc} \qquad \text{(Equation 9)}$$

where $V_{rt\_n}$ represents the voltage 462. Additionally, $I_R$ represents the current 412, and $R_{ntc}$ represents the resistance of the resistor 470 (e.g., R1). For example, $I_R$ remains approximately constant regardless of temperature. As an example, $R_{ntc}$ decreases with the increasing temperature of the resistor 470, and $R_{ntc}$ increases with the decreasing temperature of the resistor 470. In some embodiments, $V_{rt\_n}$ decreases with the increasing temperature of the resistor 470, and $V_{rt\_n}$ increases with the decreasing temperature of the resistor 470. For example, the voltage 462 (e.g., $V_{rt\_n}$) depends on the temperature of the resistor 470. As an example, the voltage 462 (e.g., $V_{rt\_n}$) is used to detect the temperature of the resistor 470.

According to some embodiments, if the threshold voltage 422 (e.g., VR) is larger than the voltage 462, the transconductance amplifier 710 (e.g., GM), together with the diode 740, generates the current 712 (e.g., Ic) as follows:

$$I_c = G_m \times (V_R - V_{rt\_n}) \qquad \text{(Equation 10)}$$

where $I_c$ represents the current 712, and $G_m$ represents the transconductance of the transconductance amplifier 710. Additionally, $V_R$ represents the threshold voltage 422, and $V_{rt\_n}$ represents the voltage 462. For example, if $V_R$ is larger than $V_{rt\_n}$, $I_c$ is larger than zero and the current 712 flows out of the output terminal of the transconductance amplifier 510. As an example, if $V_R$ is smaller than $V_{rt\_n}$, the current 712 (e.g., $I_c$) is equal to zero in magnitude.

According to certain embodiments, if the threshold voltage 422 (e.g., VR) is larger than the voltage 462, based at least in part on the current 712 (e.g., Ic) and the predetermined voltage 722 (e.g., Vref_cc_ini), the operational amplifier 720 generates the voltage 480 (e.g., Vref_cc) as follows:

$$V_{ref\_cc} = V_{ref\_cc\_ini} - I_c \times R_c \qquad \text{(Equation 11)}$$

where $V_{ref\_cc}$ represents the voltage 480, and $V_{ref\_cc\_ini}$ represents the predetermined voltage 722. Additionally, $I_c$ represents the current 712, and $R_c$ represents the resistance of the resistor 730.

In some embodiments, if the threshold voltage 422 (e.g., VR) is larger than the voltage 462, by combining Equations 9, 10 and 11, the voltage 480 is determined as follows:

$$V_{ref\_cc} = V_{ref\_cc\_ini} - G_m \times (V_R \times I_R \times R_{ntc}) \times R_c \qquad \text{(Equation 12)}$$

where $V_{ref\_cc}$ represents the voltage 480, and $V_{ref\_cc\_ini}$ represents the predetermined voltage 722. Additionally, $G_m$ represents the transconductance of the transconductance amplifier 710, and $V_R$ represents the threshold voltage 422. Also, $I_R$ represents the current 412, $R_{ntc}$ represents the resistance of the resistor 470, and $R_c$ represents the resistance of the resistor 730.

In certain embodiments, the temperature value of the resistor 470 (e.g., R1) at which the voltage 462 is equal to the threshold voltage 422 (e.g., VR) is a threshold temperature that corresponds to the threshold voltage 422 (e.g., VR). As an example, if the temperature of the resistor 470 (e.g., R1) is lower than or equal to the threshold temperature, the current 712 is equal to zero in magnitude. For example, if the temperature of the resistor 470 (e.g., R1) is higher than the threshold temperature, the current 712 flows out of the output terminal of the transconductance amplifier 610.

In some embodiments, if the temperature of the resistor 470 (e.g., R1) is higher than the threshold temperature, the magnitude of the current 712 that flows out of the output terminal of the transconductance amplifier 610 increases with the increasing temperature but the voltage 480 decreases with the increasing temperature. For example, if the circuit 400 for power modulation is used as the circuit 2142 for power modulation of the PWM controller 2100 of the charging system 100, when the voltage 480 decreases, the input power of the charging system 100 also decreases, causing the temperature of the resistor 470 (e.g., the resistor 128) to reduce, until an equilibrium is achieved. As an example, if the circuit 400 for power modulation is used as the circuit 2392 for power modulation of the charging controller 2300 of the charging system 100, when the voltage 480 decreases, the output power of the charging system 100 also decreases, causing the temperature of the resistor 470 (e.g., the resistor 138) to reduce, until an equilibrium is achieved.

In certain embodiments, if the temperature of the resistor 470 (e.g., R1) is lower than the threshold temperature, the magnitude of the current 712 is equal to zero and the voltage 480 is constant and equal to the predetermined voltage 722. For example, if the circuit 400 for power modulation is used as the circuit 2142 for power modulation of the PWM controller 2100 of the charging system 100, when the temperature of the resistor 470 (e.g., R1) is lower than the threshold temperature, the input power of the charging system 100 does not change with the temperature of the resistor 470 (e.g., the resistor 128). As an example, if the circuit 400 for power modulation is used as the circuit 2392 for power modulation of the charging controller 2300 of the charging system 100, when the temperature of the resistor 470 (e.g., R1) is lower than the threshold temperature, the output power of the charging system 100 does not change with the temperature of the resistor 470 (e.g., the resistor 138).

Figure 8:
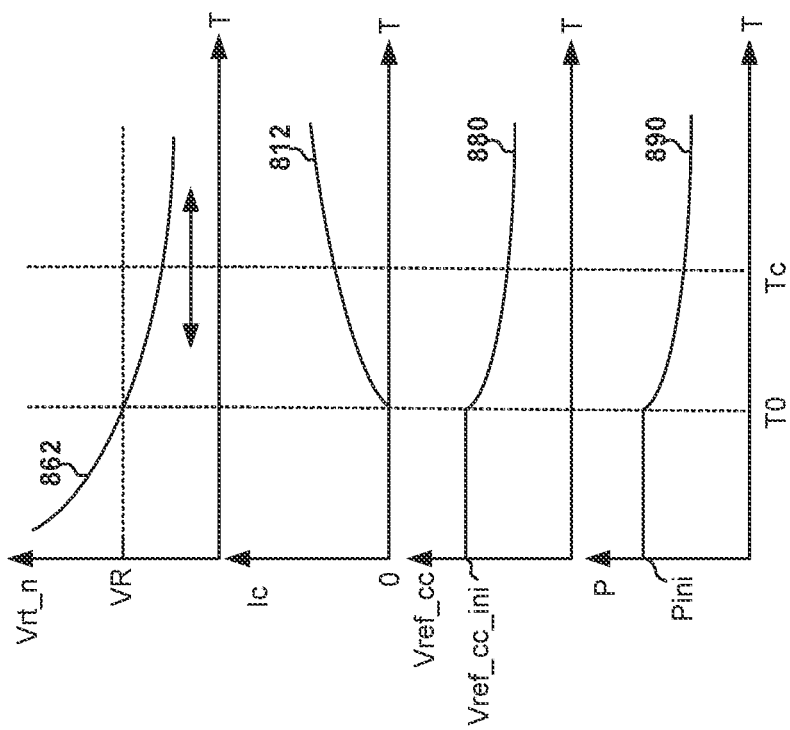
FIG. 8 shows a simplified diagram for the charging system that includes the circuit for power modulation as shown in FIG. 6 and/or includes the circuit for power modulation as shown in FIG. 7 according to certain embodiments of the present invention.

FIG. 8 shows a simplified diagram for the charging system 100 that includes the circuit 400 for power modulation as shown in FIG. 6 and/or includes the circuit 400 for power modulation as shown in FIG. 7 according to certain embodiments of the present invention. This diagram is merely an example, which should not unduly limit the scope of the claims. One of ordinary skill in the art would recognize many variations, alternatives, and modifications. The waveform 862 represents the voltage 462 as a function of temperature of the resistor 470, the waveform 812 represents the current 612 and/or the current 712 as a function of temperature of the resistor 470, the waveform 880 represents the voltage 480 as a function of temperature of the resistor 470, and the waveform 890 represents the input power and/or the output power of the charging system 100 as a function of temperature of the resistor 470. For example, the waveform 812 represents the current 612 as a function of temperature of the resistor 470 if the charging system 100 includes the circuit 400 for power modulation as shown in FIG. 6, and the waveform 812 represents the current 712 as a function of temperature of the resistor 470 if the charging system 100 includes the circuit 400 for power modulation as shown in FIG. 7. As an example, the waveform 890 represents the input power of the charging system 100 as a function of temperature of the resistor 470 if the circuit 400 for power modulation is used as the circuit 2142 for power modulation of the PWM controller 2100 of the charging system 100, and the waveform 890 represents the output power of the charging system 100 as a function of temperature of the resistor 470 if the circuit 400 for power modulation is used as the circuit 2392 for power modulation of the charging controller 2300 of the charging system 100.

As shown in FIG. 8, $T_0$ represents the threshold temperature that corresponds to the threshold voltage 422 (e.g., VR) according to some embodiments. For example, if the temperature of the resistor 470 is equal to the threshold voltage 422 (e.g., VR), the voltage 462 is equal to the threshold voltage 422 (e.g., VR). According to certain embodiments, if the temperature of the resistor 470 is lower than or equal to the threshold temperature (e.g., $T_0$), the current 612 and/or the current 712 remains equal to zero in magnitude, independent of the temperature of the resistor 470, as shown by the waveform 812. For example, if the temperature of the resistor 470 is lower than or equal to the threshold temperature (e.g., $T_0$), the voltage 480 remains equal to the predetermined voltage 622 (e.g., $V_{ref\_cc\_ini}$) and/or the predetermined voltage 722 (e.g., $V_{ref\_cc\_ini}$), independent of the temperature of the resistor 470, as shown by the waveform 880. As an example, if the temperature of the resistor 470 is lower than or equal to the threshold temperature (e.g., $T_0$), the input power and/or the output power of the charging system 100 remains equal to a constant power level (e.g., $P_{ini}$), independent of the temperature of the resistor 470, as shown by the waveform 890.

In some embodiments, if the temperature of the resistor 470 is higher than the threshold temperature (e.g., $T_0$), the current 612 and/or the current 712 increases with the increasing temperature of the resistor 470 as shown by the waveform 812. For example, if the temperature of the resistor 470 is higher than the threshold temperature (e.g., $T_0$), the voltage 480 decreases with the increasing temperature of the resistor as shown by the waveform 880. As an example, if the temperature of the resistor 470 is higher than the threshold temperature (e.g., $T_0$), the input power and/or the output power of the charging system 100 decreases with the increasing temperature of the resistor 400 as shown by the waveform 890.

In certain embodiments, the decrease of the input power and/or the output power of the charging system 100 causes the temperature of the resistor 400 to reduce rate of increase and/or to simply decrease as a result of a negative feedback loop. In some examples, if the circuit 400 for power modulation is used as the circuit 2142 for power modulation of the PWM controller 2100 of the charging system 100, when the temperature of the resistor 470 is higher than the threshold temperature (e.g., $T_0$), the input power of the charging system 100 decreases, causing the temperature of the resistor 470 (e.g., the resistor 128) to reduce rate of increase and/or to simply decrease, until the temperature of the resistor 470 (e.g., the resistor 128) becomes stable at an equilibrium temperature $T_C$ as shown by the waveform 862. For example, if the circuit 400 for power modulation is used as the circuit 2142 for power modulation of the PWM controller 2100 of the charging system 100, when the temperature of the resistor 470 (e.g., the resistor 128) becomes stable at the equilibrium temperature $T_C$, the input power of the charging system 100 also becomes stable at a power level corresponding to the equilibrium temperature $T_C$ as shown by the waveform 890. In certain examples, if the circuit 400 for power modulation is used as the circuit 2392 for power modulation of the charging controller 2300 of the charging system 100, when the temperature of the resistor 470 is higher than the threshold temperature (e.g., $T_0$), the output power of the charging system 100 decreases, causing the temperature of the resistor 470 (e.g., the resistor 128) to reduce rate of increase and/or to simply decrease, until the temperature of the resistor 470 (e.g., the resistor 128) becomes stable at the equilibrium temperature $T_C$ as shown by the waveform 862. As an example, if the circuit 400 for power modulation is used as the circuit 2392 for power modulation of the charging controller 2300 of the charging system 100, when the temperature of the resistor 470 (e.g., the resistor 128) becomes stable at the equilibrium temperature $T_C$, the output power of the charging system 100 also becomes stable at the power level corresponding to the equilibrium temperature $T_C$ as shown by the waveform 890.

According to some embodiments, a system controller for changing an input power of a charging system that is configured to receive an input voltage and charge a device includes: a first controller terminal configured to receive a first voltage indicating a temperature; and a second controller terminal configured to output a second voltage to affect the input power of the charging system; wherein the system controller is further configured to, if the first voltage indicates that the temperature is higher than a temperature threshold: in response to the temperature increasing, decrease the input power of the charging system; and in response to the temperature decreasing, increase the input power of the charging system. For example, the system controller is implemented according to at least FIG. 1, FIG. 2, FIG. 4, FIG. 5, FIG. 6, and/or FIG. 7.

As an example, the system controller is further configured to, if the first voltage indicates that the temperature is lower than the temperature threshold, keep the input power at a constant power level regardless of whether the temperature increases or decreases. For example, the system controller is further configured to, if the first voltage indicates that the temperature is lower than the temperature threshold: in response to the temperature increasing, decrease the input power of the charging system; and in response to the temperature decreasing, increase the input power of the charging system. As an example, the first controller terminal is coupled to a resistor terminal of a resistor associated with a resistance; wherein: the resistance increases with the decreasing temperature; and the resistance decreases with the increasing temperature.

For example, the system controller further includes a reference voltage generator configured to: process information associated with the first voltage indicating the temperature; and generate a reference voltage based on at least information associated with the temperature. As an example, the reference voltage generator is further configured to, if the first voltage indicates that the temperature is higher than the temperature threshold, in response to the temperature changing, change the reference voltage to change the input power of the charging system. For example, the reference voltage generator is further configured to, if the first voltage indicates that the temperature is higher than the temperature threshold: in response to the temperature increasing, decrease the reference voltage to decrease the input power of the charging system; and in response to the temperature decreasing, increase the reference voltage to increase the input power of the charging system. As an example, the reference voltage generator is further configured to, if the first voltage indicates that the temperature is lower than the temperature threshold, keep the reference voltage at a predetermined voltage regardless of whether the temperature increases or decreases. For example, the reference voltage generator is further configured to, if the first voltage indicates that the temperature is lower than the temperature threshold, in response to the temperature changing, change the reference voltage to change the input power of the charging system. As an example, the reference voltage generator is further configured to, if the first voltage indicates that the temperature is lower than the temperature threshold, in response to the temperature increasing, decrease the reference voltage to decrease the input power of the charging system; and in response to the temperature decreasing, increase the reference voltage to increase the input power of the charging system.

For example, the reference voltage generator includes a current source configured to provide a current that flows to a resistor through the first controller terminal to generate the first voltage. As an example, the reference voltage generator further includes a voltage modulation circuit configured to receive a threshold voltage and the first voltage and generate the reference voltage based at least in part on the threshold voltage and the first voltage; wherein the voltage modulation circuit is further configured to, if the first voltage is smaller than the threshold voltage in magnitude, change the reference voltage with the changing first voltage. For example, the voltage modulation circuit is further configured to, if the first voltage is smaller than the threshold voltage in magnitude: in response to the first voltage decreasing, decrease the reference voltage; and in response to the first voltage increasing, increase the reference voltage.

As an example, the voltage modulation circuit is further configured to, if the first voltage is larger than the threshold voltage in magnitude, keep the reference voltage at a predetermined voltage regardless of whether the first voltage increases or decreases. For example, the voltage modulation circuit is further configured to, if the first voltage is larger than the threshold voltage in magnitude, change the reference voltage with the changing first voltage. As an example, the voltage modulation circuit is further configured to, if the first voltage is larger than the threshold voltage in magnitude: in response to the first voltage decreasing, decrease the reference voltage; and in response to the first voltage increasing, increase the reference voltage. For example, the system controller is further configured to, if the first voltage indicates that the temperature is higher than the temperature threshold: in response to the temperature increasing, decrease the input power and the output power of the charging system; and in response to the temperature decreasing, increase the input power and the output power of the charging system.

According to certain embodiments, a system controller for changing an output power of a charging system that is configured to receive an input voltage and charge a device includes: a first controller terminal configured to receive a sensing voltage indicating a temperature; and a second controller terminal configured to provide a first current to affect the output power of the charging system; wherein the system controller is further configured to, if the sensing voltage indicates that the temperature is higher than a temperature threshold: in response to the temperature increasing, decrease the output power of the charging system; and in response to the temperature decreasing, increase the output power of the charging system. For example, the system controller is implemented according to at least FIG. 1, FIG. 3, FIG. 4, FIG. 5, FIG. 6, and/or FIG. 7.

As an example, the system controller is further configured to, if the sensing voltage indicates that the temperature is lower than the temperature threshold, keep the output power at a constant power level regardless of whether the temperature increases or decreases. For example, the system controller is further configured to, if the sensing voltage indicates that the temperature is lower than the temperature threshold: in response to the temperature increasing, decrease the output power of the charging system; and in response to the temperature decreasing, increase the output power of the charging system. As an example, the first controller terminal is coupled to a resistor terminal of a resistor associated with a resistance; wherein: the resistance increases with the decreasing temperature; and the resistance decreases with the increasing temperature.

For example, the system controller further includes a reference voltage generator configured to: process information associated with the sensing voltage indicating the temperature; and generate a reference voltage based on at least information associated with the temperature. As an example, the reference voltage generator is further configured to, if the sensing voltage indicates that the temperature is higher than the temperature threshold, in response to the temperature changing, change the reference voltage to change the output power of the charging system. For example, the reference voltage generator is further configured to, if the sensing voltage indicates that the temperature is higher than the temperature threshold: in response to the temperature increasing, decrease the reference voltage to decrease the output power of the charging system; and in response to the temperature decreasing, increase the reference voltage to increase the output power of the charging system.

As an example, the reference voltage generator is further configured to, if the sensing voltage indicates that the temperature is lower than the temperature threshold, keep the reference voltage at a predetermined voltage regardless of whether the temperature increases or decreases. For example, the reference voltage generator is further configured to, if the sensing voltage indicates that the temperature is lower than the temperature threshold, in response to the temperature changing, change the reference voltage to change the output power of the charging system. As an example, the reference voltage generator is further configured to, if the sensing voltage indicates that the temperature is lower than the temperature threshold: in response to the temperature increasing, decrease the reference voltage to decrease the output power of the charging system; and in response to the temperature decreasing, increase the reference voltage to increase the output power of the charging system.

For example, the reference voltage generator includes a current source configured to provide a second current that flows to a resistor through the first controller terminal to generate the sensing voltage. As an example, the reference voltage generator further includes a voltage modulation circuit configured to receive a threshold voltage and the sensing voltage and generate the reference voltage based at least in part on the threshold voltage and the sensing voltage; wherein the voltage modulation circuit is further configured to, if the sensing voltage is smaller than the threshold voltage in magnitude, change the reference voltage with the changing sensing voltage. For example, the voltage modulation circuit is further configured to, if the sending voltage is smaller than the threshold voltage in magnitude: in response to the sensing voltage decreasing, decrease the reference voltage; and in response to the sensing voltage increasing, increase the reference voltage. As an example, the voltage modulation circuit is further configured to, if the sensing voltage is larger than the threshold voltage in magnitude, keep the reference voltage at a predetermined voltage regardless of whether the sensing voltage increases or decreases. For example, the voltage modulation circuit is further configured to, if the sensing voltage is larger than the threshold voltage in magnitude, change the reference voltage with the changing sensing voltage. As an example, the voltage modulation circuit is further configured to, if the sensing voltage is larger than the threshold voltage in magnitude: in response to the sensing voltage decreasing, decrease the reference voltage; and in response to the sensing voltage increasing, increase the reference voltage.

For example, the second controller terminal is further configured to provide the first current that flows into the system controller through the second controller terminal. As an example, the system controller is further configured to, if the sensing voltage indicates that the temperature is higher than the temperature threshold: in response to the temperature increasing, decrease the output power and the input power of the charging system; and in response to the temperature decreasing, increase the output power and the input power of the charging system.

According to some embodiments, a method for changing an input power of a charging system that is configured to receive an input voltage and charge a device includes: receiving a first voltage indicating a temperature; and outputting a second voltage to affect the input power of the charging system based on at least information associated with the temperature; wherein the outputting a second voltage to affect the input power of the charging system based on at least information associated with the temperature includes: if the first voltage indicates that the temperature is higher than a temperature threshold, in response to the temperature increasing, decreasing the input power of the charging system; and if the first voltage indicates that the temperature is higher than the temperature threshold, in response to the temperature decreasing, increasing the input power of the charging system. For example, the method is implemented according to at least FIG. 1, FIG. 2, FIG. 4, FIG. 5, FIG. 6, and/or FIG. 7.

According to certain embodiments, a method for changing an output power of a charging system that is configured to receive an input voltage and charge a device includes: receiving a sensing voltage indicating a temperature; and providing a current to affect the output power of the charging system based on at least information associated with the temperature; wherein the providing a current to affect the output power of the charging system based on at least information associated with the temperature includes: if the sensing voltage indicates that the temperature is higher than a temperature threshold, in response to the temperature increasing, decreasing the output power of the charging system; and if the sensing voltage indicates that the temperature is higher than the temperature threshold, in response to the temperature decreasing, increasing the output power of the charging system. For example, the method is implemented according to at least FIG. 1, FIG. 3, FIG. 4, FIG. 5, FIG. 6, and/or FIG. 7.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system controller for changing an input power of a charging system that is configured to receive an input voltage and charge a device, the system controller comprising:
    a first controller terminal configured to receive a first voltage indicating a temperature of the charging system; and
    a second controller terminal configured to output a second voltage to affect the input power of the charging system;
    wherein the system controller is further configured to, if the first voltage indicates that the temperature is higher than a temperature threshold:
        in response to the temperature increasing, decrease the input power of the charging system; and
        in response to the temperature decreasing, increase the input power of the charging system.

2. The system controller of claim 1 is further configured to, if the first voltage indicates that the temperature is lower than the temperature threshold, keep the input power at a constant power level regardless of whether the temperature increases or decreases.

3. The system controller of claim 1 is further configured to, if the first voltage indicates that the temperature is lower than the temperature threshold:
    in response to the temperature increasing, decrease the input power of the charging system; and
    in response to the temperature decreasing, increase the input power of the charging system.

4. The system controller of claim 1 wherein:
    the first controller terminal is coupled to a resistor terminal of a resistor associated with a resistance;
    wherein:
        the resistance increases with the decreasing temperature; and the resistance decreases with the increasing temperature.

5. The system controller of claim 1, and further comprising:
a reference voltage generator configured to:
generate a reference voltage based on at least information associated with the temperature.

6. The system controller of claim 5 wherein the reference voltage generator is further configured to, if the first voltage indicates that the temperature is higher than the temperature threshold, in response to the temperature changing, change the reference voltage to change the input power of the charging system.

7. The system controller of claim 6 wherein the reference voltage generator is further configured to, if the first voltage indicates that the temperature is higher than the temperature threshold:
in response to the temperature increasing, decrease the reference voltage to decrease the input power of the charging system; and
in response to the temperature decreasing, increase the reference voltage to increase the input power of the charging system.

8. The system controller of claim 6 wherein the reference voltage generator is further configured to, if the first voltage indicates that the temperature is lower than the temperature threshold, keep the reference voltage at a predetermined voltage regardless of whether the temperature increases or decreases.

9. The system controller of claim 6 wherein the reference voltage generator is further configured to, if the first voltage indicates that the temperature is lower than the temperature threshold, in response to the temperature changing, change the reference voltage to change the input power of the charging system.

10. The system controller of claim 9 wherein the reference voltage generator is further configured to, if the first voltage indicates that the temperature is lower than the temperature threshold:
in response to the temperature increasing, decrease the reference voltage to decrease the input power of the charging system; and
in response to the temperature decreasing, increase the reference voltage to increase the input power of the charging system.

11. The system controller of claim 5 wherein the reference voltage generator includes a current source configured to provide a current that flows to a resistor through the first controller terminal to generate the first voltage.

12. The system controller of claim 11 wherein:
the reference voltage generator further includes a voltage modulation circuit configured to receive a threshold voltage and the first voltage and generate the reference voltage based at least in part on the threshold voltage and the first voltage;
wherein the voltage modulation circuit is further configured to, if the first voltage is smaller than the threshold voltage in magnitude, change the reference voltage with the changing first voltage.

13. The system controller of claim 12 wherein the voltage modulation circuit is further configured to, if the first voltage is smaller than the threshold voltage in magnitude:
in response to the first voltage decreasing, decrease the reference voltage; and
in response to the first voltage increasing, increase the reference voltage.

14. The system controller of claim 12 wherein the voltage modulation circuit is further configured to, if the first voltage is larger than the threshold voltage in magnitude, keep the reference voltage at a predetermined voltage regardless of whether the first voltage increases or decreases.

15. The system controller of claim 12 wherein the voltage modulation circuit is further configured to, if the first voltage is larger than the threshold voltage in magnitude, change the reference voltage with the changing first voltage.

16. The system controller of claim 15 wherein the voltage modulation circuit is further configured to, if the first voltage is larger than the threshold voltage in magnitude:
in response to the first voltage decreasing, decrease the reference voltage; and
in response to the first voltage increasing, increase the reference voltage.

17. The system controller of claim 1 is further configured to, if the first voltage indicates that the temperature is higher than the temperature threshold:
in response to the temperature increasing, decrease the input power and the output power of the charging system; and
in response to the temperature decreasing, increase the input power and the output power of the charging system.

18. A system controller for changing an output power of a charging system that is configured to receive an input voltage and charge a device, the system controller comprising:
a first controller terminal configured to receive a sensing voltage indicating a temperature of the charging system; and
a second controller terminal configured to provide a first current to affect the output power of the charging system;
wherein the system controller is further configured to, if the sensing voltage indicates that the temperature is higher than a temperature threshold:
in response to the temperature increasing, decrease the output power of the charging system; and
in response to the temperature decreasing, increase the output power of the charging system;
wherein the system controller is further configured to, if the sensing voltage indicates that the temperature is lower than the temperature threshold, keep the output power at a constant power level regardless of whether the temperature increases or decreases.

19. A system controller for changing an output power of a charging system that is configured to receive an input voltage and charge a device, the system controller comprising:
a first controller terminal configured to receive a sensing voltage indicating a temperature of the charging system;
a second controller terminal configured to provide a first current to affect the output power of the charging system; and
a reference voltage generator configured to:
generate a reference voltage based on at least information associated with the temperature;
wherein the system controller is further configured to, if the sensing voltage indicates that the temperature is higher than a temperature threshold:
in response to the temperature increasing, decrease the output power of the charging system; and
in response to the temperature decreasing, increase the output power of the charging system.

20. The system controller of claim 19 wherein the reference voltage generator is further configured to, if the sensing voltage indicates that the temperature is higher than the temperature threshold, in response to the temperature changing, change the reference voltage to change the output power of the charging system.

21. The system controller of claim 20 wherein the reference voltage generator is further configured to, if the sensing voltage indicates that the temperature is higher than the temperature threshold:
in response to the temperature increasing, decrease the reference voltage to decrease the output power of the charging system; and
in response to the temperature decreasing, increase the reference voltage to increase the output power of the charging system.

22. The system controller of claim 20 wherein the reference voltage generator is further configured to, if the sensing voltage indicates that the temperature is lower than the temperature threshold, keep the reference voltage at a predetermined voltage regardless of whether the temperature increases or decreases.

23. The system controller of claim 20 wherein the reference voltage generator is further configured to, if the sensing voltage indicates that the temperature is lower than the temperature threshold, in response to the temperature changing, change the reference voltage to change the output power of the charging system.

24. The system controller of claim 23 wherein the reference voltage generator is further configured to, if the sensing voltage indicates that the temperature is lower than the temperature threshold:
in response to the temperature increasing, decrease the reference voltage to decrease the output power of the charging system; and
in response to the temperature decreasing, increase the reference voltage to increase the output power of the charging system.

25. The system controller of claim 19 wherein the reference voltage generator includes a current source configured to provide a second current that flows to a resistor through the first controller terminal to generate the sensing voltage.

26. The system controller of claim 25 wherein:
the reference voltage generator further includes a voltage modulation circuit configured to receive a threshold voltage and the sensing voltage and generate the reference voltage based at least in part on the threshold voltage and the sensing voltage;
wherein the voltage modulation circuit is further configured to, if the sensing voltage is smaller than the threshold voltage in magnitude, change the reference voltage with the changing sensing voltage.

27. The system controller of claim 26 wherein the voltage modulation circuit is further configured to, if the sending voltage is smaller than the threshold voltage in magnitude:
in response to the sensing voltage decreasing, decrease the reference voltage; and
in response to the sensing voltage increasing, increase the reference voltage.

28. The system controller of claim 26 wherein the voltage modulation circuit is further configured to, if the sensing voltage is larger than the threshold voltage in magnitude, keep the reference voltage at a predetermined voltage regardless of whether the sensing voltage increases or decreases.

29. The system controller of claim 26 wherein the voltage modulation circuit is further configured to, if the sensing voltage is larger than the threshold voltage in magnitude, change the reference voltage with the changing sensing voltage.

30. The system controller of claim 29 wherein the voltage modulation circuit is further configured to, if the sensing voltage is larger than the threshold voltage in magnitude:
in response to the sensing voltage decreasing, decrease the reference voltage; and
in response to the sensing voltage increasing, increase the reference voltage.

31. A system controller for changing an output power of a charging system that is configured to receive an input voltage and charge a device, the system controller comprising:
a first controller terminal configured to receive a sensing voltage indicating a temperature of the charging system; and
a second controller terminal configured to provide a first current to affect the output power of the charging system:
wherein the system controller is further configured to, if the sensing voltage indicates that the temperature is higher than a temperature threshold:
in response to the temperature increasing, decrease the output power of the charging system; and
in response to the temperature decreasing, increase the output power of the charging system;
wherein the second controller terminal is further configured to provide the first current that flows into the system controller through the second controller terminal.

32. A method for changing an input power of a charging system that is configured to receive an input voltage and charge a device, the method comprising:
receiving a first voltage indicating a temperature of the charging system; and
outputting a second voltage to affect the input power of the charging system based on at least information associated with the temperature;
wherein the outputting a second voltage to affect the input power of the charging system based on at least information associated with the temperature includes:
if the first voltage indicates that the temperature is higher than a temperature threshold, in response to the temperature increasing, decreasing the input power of the charging system; and
if the first voltage indicates that the temperature is higher than the temperature threshold, in response to the temperature decreasing, increasing the input power of the charging system.

* * * * *